(12) United States Patent
Gao

(10) Patent No.: US 12,223,616 B2
(45) Date of Patent: *Feb. 11, 2025

(54) IMAGE PROCESSING METHOD AND APPARATUS, COMPUTER READABLE STORAGE MEDIUM, AND COMPUTER DEVICE

(71) Applicant: TENCENT TECHNOLOGY (SHENZHEN) COMPANY LIMITED, Guangdong (CN)

(72) Inventor: Hongyun Gao, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 411 days.

This patent is subject to a terminal disclaimer.

(21) Appl. No.: 17/727,042

(22) Filed: Apr. 22, 2022

(65) Prior Publication Data

US 2022/0253974 A1    Aug. 11, 2022

Related U.S. Application Data

(63) Continuation of application No. PCT/CN2020/122160, filed on Oct. 20, 2020.

(30) Foreign Application Priority Data

Feb. 7, 2020   (CN) .......................... 202010082474.0

(51) Int. Cl.
*G06T 3/4038* (2024.01)
*G06T 3/4046* (2024.01)

(52) U.S. Cl.
CPC .......... *G06T 3/4038* (2013.01); *G06T 3/4046* (2013.01)

(58) Field of Classification Search
CPC . G06T 5/00–94; G06T 3/4038; G06T 3/4046; G06T 2207/20084
See application file for complete search history.

(56) References Cited

U.S. PATENT DOCUMENTS 11,354,785 B2*   6/2022   Tao ........................... G06T 5/50
11,741,581 B2*   8/2023   Gao ....................... G06V 10/82
(Continued)

FOREIGN PATENT DOCUMENTS

CN   102915527 A       2/2013
CN   108510560 A *     9/2018   ............. G06T 5/001
(Continued)

OTHER PUBLICATIONS

Chinese Office Action issued Jun. 16, 2023 in Application No. 202010082474.0, with English Translation, pp. 1-29.
(Continued)

*Primary Examiner* — Sean T Motsinger
(74) *Attorney, Agent, or Firm* — ArentFox Schiff LLP

(57) ABSTRACT

A method includes zooming out a to-be-processed image from a first size to a second size and determining a first feature map based on at least a feature reconstruction on the to-be-processed image of the second size by a first codec of a first set of coding units. The first set of coding units includes at least a pair of encoder and decoder. The method includes zooming in the first feature map to the first size, performing a splicing processing on the to-be-processed image of the first size and the first feature map of the first size to obtain a spliced feature map, and performing a feature reconstruction on the spliced feature map by a target codec, to obtain a target image. The target codec includes a target set of coding units, and a first subset of the target set corresponds to the first set of coding units.

18 Claims, 8 Drawing Sheets

(56) References Cited

U.S. PATENT DOCUMENTS

| | | | |
|---|---|---|---|
| 2011/0274370 A1 | 11/2011 | Kondo et al. | |
| 2017/0365046 A1 | 12/2017 | Tezaur et al. | |
| 2020/0349680 A1* | 11/2020 | Tao | G06T 5/73 |
| 2022/0253974 A1* | 8/2022 | Gao | G06T 3/4046 |
| 2023/0043310 A1* | 2/2023 | Yang | G06N 3/08 |

FOREIGN PATENT DOCUMENTS

| | | |
|---|---|---|
| CN | 108629743 A | 10/2018 |
| CN | 109522840 A | 3/2019 |
| CN | 111340694 A | 6/2020 |
| WO | 2020/187042 A1 | 9/2020 |

OTHER PUBLICATIONS

International Search Report dated Jan. 18, 2021 issued in PCT/CN2020/122160 (with English translation).

* cited by examiner

IMAGE PROCESSING METHOD AND APPARATUS, COMPUTER READABLE STORAGE MEDIUM, AND COMPUTER DEVICE

RELATED APPLICATIONS

This application is a continuation of International Application No. PCT/CN2020/122160, entitled "IMAGE PROCESSING METHOD AND APPARATUS, COMPUTER READABLE STORAGE MEDIUM, AND COMPUTER DEVICE" and filed on Oct. 20, 2020, which claims priority to Chinese Patent Application No. 202010082474.0, entitled "IMAGE PROCESSING METHOD AND APPARATUS, COMPUTER READABLE STORAGE MEDIUM, AND COMPUTER DEVICE" and filed on Feb. 7, 2020. The entire disclosures of the prior applications are hereby incorporated by reference in their entirety.

FIELD OF THE TECHNOLOGY

This disclosure relates to the field of computer technologies including an image processing method and apparatus, a computer readable storage medium, and a computer device.

BACKGROUND OF THE DISCLOSURE

Image recovery is a common problem in daily life, and an objective of image recovery is to recover images that are irreversible, complex, and damaged in an imaging process. When a user is in a dark light scenario or a motion scenario, different degrees of noise or blur usually occur in a picture. An image recovery algorithm may be used for reconstructing details that are lost due to blur or noise.

However, a related image recovery method can only address a specific type of problem. For example, for image deblurring, the related image recovery method can only resolve a problem of image blurring generated in a motion process of translation or rotation. The same problem also exists in image denoising. The related image recovery method is targeted for a specific type of noise, for example, Gaussian noise and Poisson noise are removed to implement image feature reconstruction. However, an actual damaged image imaging scenario is very complex, and further includes problems such as camera motion, object motion in a scene, and image invisibility caused by different levels of noise. The related recovery method is poor in processing such images or resolving these issues.

SUMMARY

Aspects of the disclosure provide an image processing method and apparatus, a non-transitory computer readable storage medium, and a computer device for a technical problem of blurred images.

Some aspects of the disclosure provide a method of image processing. The method includes acquiring a to-be-processed image and zooming out the to-be-processed image from a first size to a second size. The method also includes determining a first feature map based on at least a feature reconstruction on the to-be-processed image of the second size by a first codec of a first set of coding units. The first set of coding units includes at least a pair of encoder and decoder. The method includes zooming in the first feature map to the first size, performing a splicing processing on the to-be-processed image of the first size and the first feature map of the first size to obtain a spliced feature map, and performing a feature reconstruction on the spliced feature map by a target codec, to obtain a target image. The target codec includes a target set of coding units, and a first subset of the target set of coding units corresponds to the first set of coding units.

Some aspects of the disclosure provide an apparatus that includes processing circuitry. The processing circuitry acquires a to-be-processed image and zooms out the to-be-processed image from a first size to a second size. The processing circuitry determines a first feature map based on at least a feature reconstruction on the to-be-processed image of the second size by a first codec of a first set of coding units. The first set of coding units includes at least a pair of encoder and decoder. The processing circuitry zooms in the first feature map to the first size, performs a splicing processing on the to-be-processed image of the first size and the first feature map of the first size to obtain a spliced feature map, and performs a feature reconstruction on the spliced feature map by a target codec, to obtain a target image. The target codec includes a target set of coding units, a first subset of the target set of coding units corresponding to the first set of coding units.

Some aspects of the disclosure provide a non-transitory computer-readable medium storing instructions which when executed by a computer cause the computer to perform the method of image processing.

BRIEF DESCRIPTION OF THE DRAWINGS

To describe the technical solutions of the embodiments of this disclosure or the related art more clearly, the following briefly introduces the accompanying drawings required for describing the embodiments or the related art. The accompanying drawings in the following description show some embodiments of this disclosure.

DESCRIPTION OF EMBODIMENTS

To help understand this disclosure, the following describes this disclosure more fully with reference to the related accompanying drawings. The accompanying drawings show exemplary embodiments of this disclosure. However, this disclosure may be implemented in many different forms, and is not limited to the embodiments described in this specification. On the contrary, the embodiments are provided to make understanding of the disclosed content of this disclosure more comprehensive. It is to be understood that the specific embodiments described herein are merely used for explaining this disclosure but are not intended to limit this disclosure.

Figure 1:
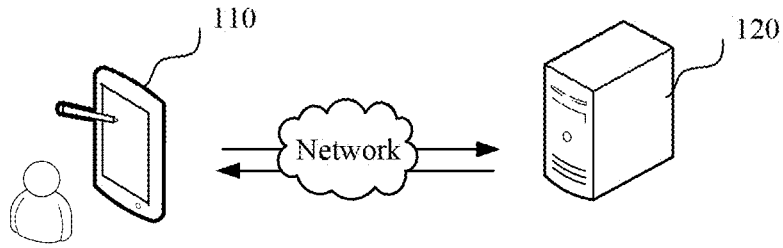
FIG. 1 is an application environment diagram of an image processing method according to an embodiment.

FIG. 1 is an application environment diagram of an image processing method according to an embodiment. Referring to FIG. 1, the image processing method is applied to an image processing system. The image processing system includes a terminal 110 and a server 120. The terminal 110 and the server 120 are connected by using a network. The terminal 110 may be specifically a desktop terminal or a mobile terminal. The mobile terminal may be specifically at least one of a mobile phone, a tablet computer, a notebook computer, and the like. The server 120 may be implemented by using an independent server or a server cluster that includes a plurality of servers. In this embodiment, the terminal 110 may independently implement the image processing method. The terminal 110 may also implement the image processing method by cooperating with the server 120.

The terminal 110 may acquire a to-be-processed image, and send the to-be-processed image to the server 120. The server 120 receives the to-be-processed image, and zooms out the to-be-processed image from a first size to a second size. The server 120 performs feature reconstruction on the to-be-processed image of the second size by using a first codec, to obtain a first feature map. The server 120 zooms in the first feature map to the first size, and performs splicing processing on the to-be-processed image of the first size and the first feature map of the first size. The server 120 performs feature reconstruction on the spliced feature map by using a target codec, to obtain a target image, definition of the target image being higher than definition of the to-be-processed image; and the target codec including a first preset quantity of pairs of encoders and decoders, and the first codec being at least one pair in the first preset quantity of pairs of encoders and decoders. The server 120 returns the target image to the terminal 110. By using the image processing method in this embodiment, a blurred to-be-processed image with noise can be reconstructed into a clear image.

In an embodiment, the terminal acquires a face image whose size is 300*400. If a face region in the face image is blurred, the terminal performs feature extraction and feature reconstruction on the face image by using the processing method, so as to obtain a face image whose face region is clear.

Specifically, the terminal zooms out the 300*400 face image by ¼ to obtain a 75*100 face image. A coarse scale feature of a face region is displayed in the 75*100 face image. The terminal performs feature reconstruction on the 75*100 face image by using a pair of codecs, to obtain a 75*100 feature map, thereby reconstructing a coarse scale feature of the face region in the face image.

Then, the terminal zooms in the 75*100 feature map twice to obtain a 150*200 feature map. The 300*400 face image is zoomed out by ½ to obtain a 150*200 face image. The 150*200 face image and the 150*200 feature map display an intermediate scale feature of the face region. Then, the terminal splices the 150*200 feature map and the 150*200 face image. Two pairs of codecs are used for performing feature reconstruction on the spliced feature map to obtain the reconstructed 150*200 feature map, so as to reconstruct the intermediate scale feature of the face region in the face image. One of the two pairs of codecs is the same as the codec used in coarse scale feature reconstruction.

Then, a fine scale feature of the face region is displayed in the face image whose size is 300*400. The terminal zooms in the 150*200 feature map twice to obtain a 300*400 feature map. A fine scale feature of the face region is also displayed in the feature map whose size is 300*400. The terminal splices the 300*400 feature map and the 300*400 face image. Feature reconstruction is performed on the spliced feature map by using three pairs of codecs to obtain a 300*400 target image, thereby reconstructing a fine scale feature of the face region in the face image. Two of the three pairs of codecs are the same as the two codecs used in intermediate scale feature reconstruction.

The coarse scale feature, the intermediate scale feature, and the fine scale feature of the face region in the face image are successively reconstructed, so that the blurred face region can gradually become clear. In addition, a more refined feature scale is processed by increasing a quantity of codecs, so as to reduce difficulty in recovering the refined feature scale and ensure accuracy of feature reconstruction, thereby obtaining a clear face image.

Figure 2:
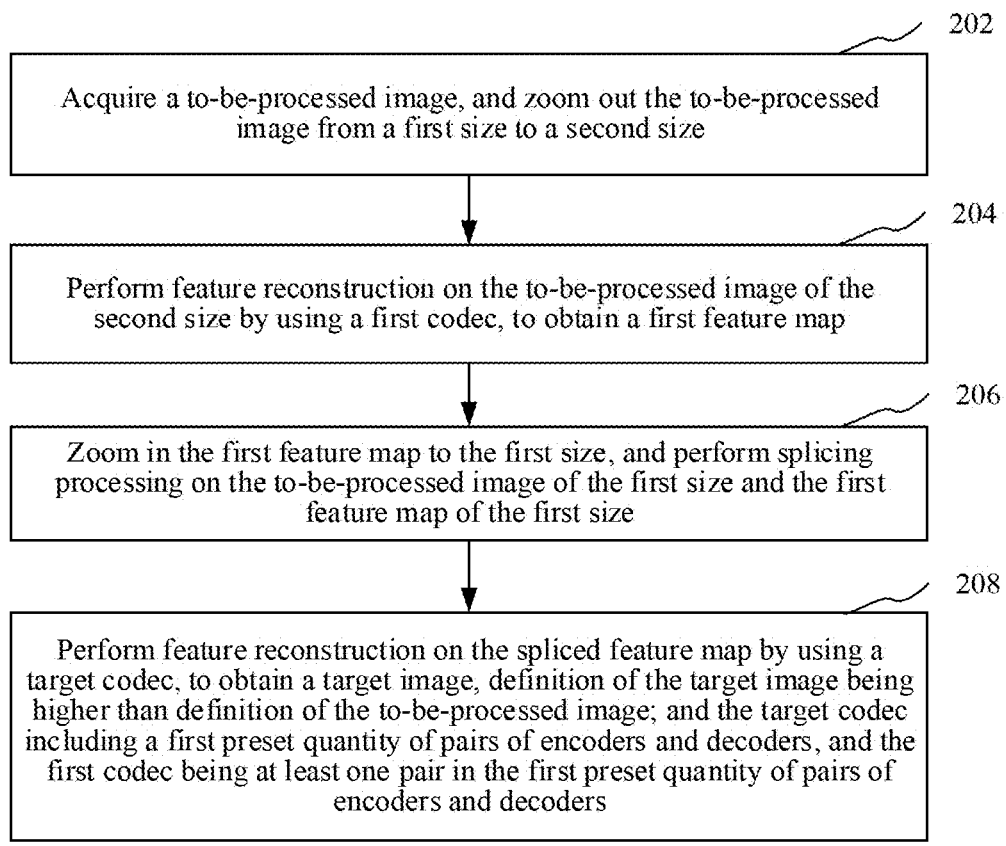
FIG. 2 is a schematic flowchart of an image processing method according to an embodiment.

As shown in FIG. 2, an embodiment provides an image processing method. This embodiment is mainly described by using an example in which the method is applied to the terminal 110 (or the server 120) in FIG. 1. Referring to FIG. 2, the image processing method specifically includes the following steps:

In step 202, a to-be-processed image is acquired, and zoomed out from a first size to a second size.

The to-be-processed image is an image with low definition, such as a blurred image or an image with noise. The first size is an original size of the acquired to-be-processed image, the second size is a size of the zoomed-out to-be-processed image, and the second size may be ¼, ⅕, ⅙, or the like of the first size of the to-be-processed image.

Specifically, a smaller image leads to a more obvious coarse scale feature of the image. A larger image leads to a more obvious detail feature of the image, that is, a more obvious fine scale feature. When the blurred image is zoomed out to a smaller size, the detail feature of the image is less displayed, and the coarse scale feature is more displayed, so that a degree of blurring of the image is significantly reduced. In this case, difficulty in reconstructing a feature of a small-size blurred image is less than difficulty in reconstructing a feature of an original-size blurred image. The terminal may acquire the to-be-processed image, and zoom out the to-be-processed image to the second size, so that the image displays a coarse scale feature, so as to first reconstruct a blurred region that exists in the coarse scale feature.

In this embodiment, the terminal acquires the to-be-processed image, determines an original size of the acquired to-be-processed image, and uses the original size as the first size. For example, if the size of the to-be-processed image acquired by the terminal is 330*400, 330*400 is used as the first size of the to-be-processed image. If the size of the to-be-processed image acquired by the terminal is 450*600, 450*600 is used as the first size of the to-be-processed image. Then, the terminal zooms out the to-be-processed image of the first size to the second size, to obtain the to-be-processed image of the second size.

In step 204, feature reconstruction is performed on the to-be-processed image of the second size by using a first codec, to obtain a first feature map.

The first codec refers to a pair of encoder and decoder. That is, the first codec includes an encoder and a decoder corresponding to the encoder. The first codec includes a pair of encoder and decoder, and a quantity of pairs of encoders and decoders may be set according to a requirement, for example, one pair or two pairs.

Specifically, the terminal may input the to-be-processed image of the second size into a first network, where the first network is a network of a coarse scale feature of a reconstructed image. The first network includes the first codec, and a quantity of first codecs may be set according to a requirement. The encoder in the first codec in the first network performs feature extraction on the to-be-processed image of the second size, and the encoder inputs the extracted feature map into the decoder corresponding to the encoder for decoding, to obtain a feature map outputted by the decoder. The feature map outputted by the decoder is the first feature map.

In this embodiment, when there are at least two pairs of encoders and decoders in the first codec, the to-be-processed image of the second size is encoded by using the first encoder, and a feature map outputted by a previous encoder is encoded by using a next encoder until a feature map outputted by the last encoder in the first codec is obtained. Then, in a decoder corresponding to the feature map input outputted by the last encoder, the feature map is decoded by using the decoder to obtain a feature map outputted by the last decoder. The feature map outputted by the last decoder is the first feature map.

In this embodiment, the second size may be ¼ of the first size, and after performing feature reconstruction on the to-be-processed image of the ¼ size, the first codec obtains an intermediate feature map. A size of the intermediate feature map is also ¼ of the first size. Then, the terminal zooms in the intermediate feature map of the ¼ size twice to obtain the first feature map, where a size of the first feature map is ½ of the first size.

In step 206, the first feature map is zoomed in to the first size, and a splicing processing is performed on the to-be-processed image of the first size and the first feature map of the first size.

The splicing processing refers to matrix splicing of an image or parallelizing a feature map in a channel dimension.

Specifically, after the first feature map is obtained, the terminal may zoom in the first feature map to the same size as the acquired to-be-processed image, that is, the first size, so as to first reconstruct a blurred region that exists in a fine scale feature. Then, the terminal performs splicing processing on the to-be-processed image of the first size and the first feature map of the first size.

In this embodiment, the terminal may determine a matrix corresponding to the to-be-processed image of the first size and a matrix corresponding to the first feature map of the first size, and splice the two matrices. The terminal may determine a channel dimension of the to-be-processed image of the first size and a channel dimension of the first feature map of the first size, and parallelize the to-be-processed image of the first size and the first feature map of the first size according to the channel dimension.

For example, both the to-be-processed image of the first size and the first feature map of the first size are RGB color images, and a quantity of channels of the RGB color images is 3. The terminal parallelizes R, G, and B channels of the to-be-processed image of the first size and R, G, and B channels of the first feature map of the first size, to obtain a feature map whose channel quantity is 6.

In step 208, feature reconstruction is performed on the spliced feature map by using a target codec, to obtain a target image, definition of the target image is higher than definition of the to-be-processed image; and the target codec includes a first preset quantity of pairs of encoders and decoders, and the first codec is at least one pair in the first preset quantity of pairs of encoders and decoders.

The target codec refers to a pair of encoder and decoder, and the first codec serves as a pair of encoder and decoder in the target codec, and is an integral part of the target codec. The target codec includes a first preset quantity of pairs of encoders and decoders, and when the first codec includes one pair of encoder and decoder, the first codec serves as one of the first preset quantity of pairs of encoders and decoders. When the first codec includes two pairs of encoders and decoders, the first codec serves as two of the first preset quantity of pairs of encoders and decoders, and so on.

Specifically, the terminal may input the spliced feature map into a target network, where the target network is a network of a fine scale feature of the reconstructed image. The target network includes the target codec, the target codec includes a pair of encoder and decoder, and a quantity of pairs of encoders and decoders in the target codec is the first preset quantity. The first codec serves as a part of the target codec. The first encoder in the target codec in the target network performs feature extraction on the spliced feature map, and uses a feature map outputted by a previous encoder as an input to a next encoder until a feature map outputted by the last encoder in the target codec is obtained. Then, in a decoder corresponding to the feature map input outputted by the last encoder, the feature map is decoded by using the decoder. A feature map outputted by a previous decoder is used as an input to a next decoder to obtain a target image outputted by the last decoder in the target codec.

In the foregoing image processing method, the to-be-processed image is acquired, the to-be-processed image is zoomed out from the first size to the second size, and feature reconstruction is performed on the to-be-processed image of the second size by using the first codec to obtain the first feature map, so that reconstruction of the coarse scale feature of the to-be-processed image can be completed. The first feature map is zoomed in to the first size same as that of the to-be-processed image, and splicing processing is performed on the to-be-processed image of the first size and the first feature map of the first size, so as to reconstruct the fine scale feature of the to-be-processed image. Feature reconstruction is performed on the spliced feature map by using the target codec to obtain the target image, where the target codec includes the first preset quantity of pairs of encoders and decoders, and the first codec is at least one of the first preset quantity of pairs of encoders and decoders, so as to reconstruct a low-definition to-be-processed image into a high-definition target image. By reconstructing the coarse scale feature and the fine scale feature of the to-be-processed image, a blurred to-be-processed image with noise can be reconstructed into a clear image.

Figure 3:
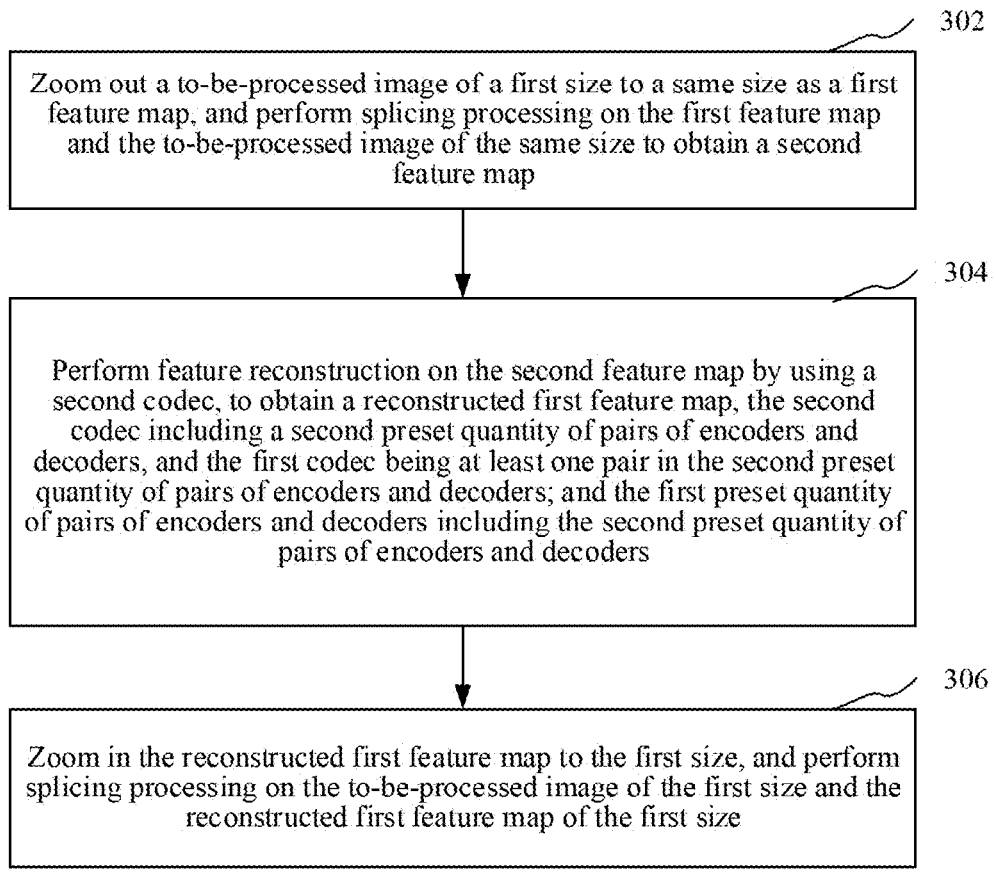
FIG. 3 is a schematic flowchart of a step of reconstructing an intermediate scale feature of a to-be-processed image according to an embodiment.

In an embodiment, as shown in FIG. 3, before the zooming in the first feature map to the first size, and performing splicing processing on the to-be-processed image of the first size and the first feature map of the first size, the method further includes:

In step 302, the to-be-processed image of the first size is zoomed out to a same size as the first feature map, and a splicing processing is performed on the first feature map and the to-be-processed image of the same size to obtain a second feature map.

Specifically, the first feature map is a feature map that reconstructs the coarse scale feature of the to-be-processed image, and the terminal may further reconstruct an intermediate scale feature of the to-be-processed image. The intermediate scale feature is a feature between the coarse scale feature and the fine scale feature. The terminal may determine the size of the first feature map, and zoom out the to-be-processed image of the first size to the same size as the first feature map. Further, if the scale of the first feature map is ½ of the first size of the to-be-processed image, the terminal zooms out the to-be-processed image of the first size to ½ of the first size, to obtain a to-be-processed image of the same size as the first feature map. Then, the terminal may perform matrix splicing on the first feature map and the to-be-processed image of the same size after zooming out, to obtain the second feature map. Alternatively, the terminal parallelizes the first feature map and the to-be-processed image of the same size after zooming out in the channel dimension to obtain the second feature map.

In step 304, feature reconstruction is performed on the second feature map by using a second codec, to obtain a reconstructed first feature map, the second codec includes a second preset quantity of pairs of encoders and decoders, and the first codec is at least one pair in the second preset quantity of pairs of encoders and decoders; and the first preset quantity of pairs of encoders and decoders includes the second preset quantity of pairs of encoders and decoders.

The second codec refers to a pair of encoder and decoder. The first codec serves as a pair of encoder and decoder in the second codec, and is a part of the second codec. The second codec includes a second preset quantity of pairs of encoders and decoders, and when the first codec includes one pair of encoder and decoder, the first codec serves as one of the second preset quantity of pairs of encoders and decoders. When the first codec includes two pairs of encoders and decoders, the first codec serves as two of the second preset quantity of pairs of encoders and decoders, and so on. The target codec includes the first preset quantity of pairs of encoders and decoders, and the first preset quantity of encoders and decoders include the second preset quantity of encoders and decoders.

Specifically, the terminal may input the second feature map into a second network, where the second network is a network of the intermediate scale feature of the reconstructed image. The second network includes the second codec, the second codec includes the second preset quantity of pairs of encoders and decoders, and the second preset quantity may be set according to a requirement. In addition, in the second network, the first codec serves as a part of the second codec. The first encoder in the second codec performs feature extraction on the second feature map, and uses a feature map outputted by a previous encoder as an input to a next encoder until a feature map outputted by the last encoder in the second codec is obtained.

Next, in a decoder corresponding to the feature map input outputted by the last encoder, a quantity of encoders and a quantity of decoders in the second codec are the same. A feature map outputted by a previous decoder is used as an input to a next decoder, and the feature map is decoded by using the decoder to obtain a feature map outputted by the last decoder in the second codec. The feature map outputted by the last decoder in the second codec is the reconstructed first feature map.

The zooming in the first feature map to the first size, and performing splicing processing on the to-be-processed image of the first size and the first feature map of the first size includes:

In step 306, the reconstructed first feature map is zoomed in to the first size, and a splicing processing is performed on the to-be-processed image of the first size and the reconstructed first feature map of the first size.

Specifically, the reconstructed first feature map is a feature map that reconstructs the intermediate scale feature of the to-be-processed image, and the terminal may further reconstruct the fine scale feature of the to-be-processed image. The fine scale feature is a more detailed feature than the intermediate scale feature. The terminal may determine the size of the acquired to-be-processed image, that is, the first size, and zoom in the reconstructed first feature map to the same first size as the to-be-processed image. Further, if the size of the reconstructed first feature map is ½ of the first size, the terminal zooms in the reconstructed first feature map twice to obtain the reconstructed first feature map of the first size. Then, the terminal may perform matrix splicing on the to-be-processed image of the first size and the reconstructed first feature map of the first size to obtain the spliced feature map. Alternatively, the terminal parallelizes the to-be-processed image of the first size and the reconstructed first feature map of the first size in the channel dimension to obtain the spliced feature map.

Then, the terminal may input the spliced feature map into the target network, and perform feature reconstruction on the spliced feature map by using the target encoder in the target network, so as to reconstruct the fine scale feature of the to-be-processed image, so as to obtain a high-definition target image. A size of the target image is the first size.

In this embodiment, the to-be-processed image of the first size is zoomed out to the same size as the first feature map, the first feature map and the to-be-processed image of the same size are spliced to obtain the second feature map, and feature reconstruction is performed on the second feature map by using the second codec, so as to reconstruct the intermediate scale feature of the to-be-processed image to obtain the reconstructed first feature map. The second codec includes the second preset quantity of pairs of encoders and decoders, and the first codec is at least one pair of the second preset quantity of pairs of encoders and decoders. The first preset quantity of pairs of encoders and decoders include the second preset quantity of pairs of encoders and decoders. The reconstructed first feature map is zoomed in to the first size, and splicing processing is performed on the to-be-processed image of the first size and the reconstructed first feature map of the first size, so as to reconstruct the fine scale feature of the to-be-processed image, so as to reconstruct a low-definition image into a high-definition image.

In an embodiment, the performing splicing processing on the first feature map and the to-be-processed image of the same size to obtain a second feature map includes: parallelizing the first feature map and the to-be-processed image of the same size in the channel dimension to obtain the second feature map.

The channel dimension refers to a quantity of channels of an image. For example, a quantity of channels of an RGB image is 3, and a quantity of channels of a black and white image is 1.

Specifically, the terminal determines the channel dimension of the first feature map, and determines the same channel dimension in the to-be-processed image of the same size as the first feature map. Then, the terminal splices the first feature map and the to-be-processed image of the same size in the same channel dimension to obtain the second feature map.

For example, both the first feature map and the to-be-processed image of the same size are RGB images. A quantity of channels of an RGB color image is 3, and the terminal parallelizes R, G, and B channels of the first feature map and R, G, and B channels of the to-be-processed image of the same size to obtain the second feature map whose channel quantity is 6.

In this embodiment, the first feature map and the to-be-processed image of the same size are parallelized in the channel dimension, so that a feature of the first feature map and a feature of the to-be-processed image can be associated, and the obtained second feature map has more feature information, and feature reconstruction of the to-be-processed image is more accurate.

In an embodiment, the performing feature reconstruction on the to-be-processed image of the second size by using a first codec, to obtain a first feature map includes:

inputting the to-be-processed image of the second size into a processing unit of the first codec to obtain an output feature map; and performing splicing processing on an output feature map of a previous processing unit in the first codec and the to-be-processed image of the second size, and using the spliced feature map as an input to a next processing unit until the last processing unit in the first codec outputs the first feature map.

Specifically, one encoder includes at least two processing units, and one decoder also includes at least two processing units. An internal structure of each processing unit is the same. The terminal inputs the to-be-processed image of the second size to the first codec, and a first processing unit in the first codec performs feature extraction on the to-be-processed image of the second size to obtain an output feature map outputted by the first processing unit. The first processing unit is the $1^{st}$ processing unit in the first codec. Then, the terminal performs splicing processing on the output feature map of the first processing unit and an input feature map of the first processing unit, and inputs the spliced feature map to a second processing unit to obtain an output feature map of the second processing unit.

Similarly, the terminal performs splicing processing on an output feature map of a previous processing unit in the first codec and the input feature map of the first processing unit (that is, the to-be-processed image of the second size), and uses the spliced feature map as an input to a next processing unit until an output feature map of the last processing unit in the first codec is obtained. The output feature map of the last processing unit of the first codec is the first feature map outputted by the first codec.

Figure 4:
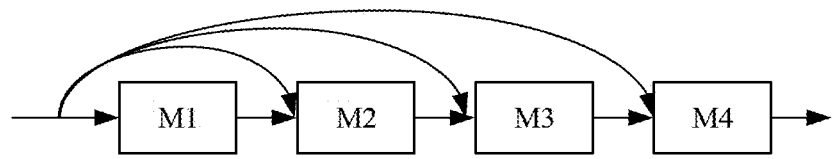
FIG. 4 is an internal structural diagram of an encoder and a decoder according to an embodiment.

FIG. 4 is an internal structural diagram of an encoder and a decoder according to an embodiment. Each encoder and decoder includes a plurality of processing units, such as M1, M2, M3, and M4. Starting from the second processing unit, the output feature map of the previous processing unit and the input feature map of the first processing unit are spliced, and the spliced feature map is used as an input to the next processing unit. For example, M1 is a first processing unit of an encoder in the first codec, and the terminal inputs the to-be-processed image of the second size into the first processing unit to obtain an output feature map. Next, starting from M2, the output feature map of M1 and the input feature map of M1 are spliced, and the spliced feature map is used as an input to M2. Splicing processing is performed on an output feature map of M2 and the input feature map of M1, and the spliced feature map is used as an input to M3. Splicing processing is performed on an output feature map of M3 and the input feature map of M1, and the spliced feature map is used as an input to M4 to obtain a feature map outputted by M4.

In this embodiment, the to-be-processed image of the second size is input into the processing unit of the first codec, the output feature map of the previous processing unit in the first codec is spliced with the to-be-processed image of the second size, and the spliced feature map is used as an input to the next processing unit, so that some features recovered by the previous processing unit can be associated with information of an original image, and the next processing unit performs feature reconstruction more quickly. In addition, effective feature information of each processing unit is added, and a calculation amount in a feature reconstruction process is reduced, thereby avoiding a problem of high fusion difficulty.

In an embodiment, the performing feature reconstruction on the to-be-processed image of the second size by using a first codec, to obtain a first feature map includes:

inputting the to-be-processed image of the second size into a processing unit of the first codec to obtain an output feature map; and performing fusion processing on an output feature map of a previous processing unit in the first codec and an input feature map of the previous processing unit, and using the fused feature map as an input to a next processing unit until the last processing unit in the first codec outputs the first feature map.

The fusion processing refers to adding the two feature maps, for example, adding weight matrices corresponding to the two feature maps.

Specifically, the terminal inputs the to-be-processed image of the second size to the first codec, and a first processing unit in the first codec performs feature extraction on the to-be-processed image of the second size to obtain an output feature map outputted by the first processing unit. Then, the terminal performs fusion processing on the output feature map of the first processing unit and the input feature map of the first processing unit, that is, performs fusion processing on the output feature map of the first processing unit and the to-be-processed image of the second size, and inputs the fused feature map into the second processing unit to obtain the output feature map of the second processing unit.

Then, the terminal performs fusion processing on the output feature map of the second processing unit and the input feature map of the second processing unit, and uses the fused feature map as an input to a next processing unit of the second processing unit.

Similarly, starting from the second processing unit in the first codec, the terminal performs fusion processing on the output feature map of the previous processing unit and the input feature map of the previous processing unit, and uses the fused feature map as an input to the next processing unit until an output feature map of the last processing unit of the first codec is obtained. The output feature map of the last processing unit of the first codec is the first feature map outputted by the first codec.

Figure 5:
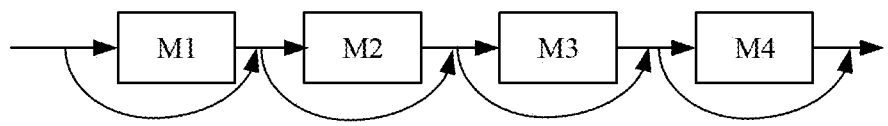
FIG. 5 is an internal structural diagram of an encoder and a decoder according to another embodiment.

FIG. 5 is an internal connection structure of an encoder and a decoder according to an embodiment. Each encoder and decoder includes a plurality of processing units, such as M1, M2, M3, and M4. Starting from the second processing unit, an output feature map of a previous processing unit and an input feature map of the first processing unit are spliced, and the spliced feature map is used as an input to a next processing unit. For example, M1 is a first processing unit of an encoder in the first codec, and the terminal inputs the to-be-processed image of the second size into the first processing unit to obtain an output feature map. Next, starting from M2, the output feature map of M1 and the input feature map of M1 are spliced, and the spliced feature map is used as an input to M2. Splicing processing is performed on an output feature map of M2 and the input feature map of M2, and the spliced feature map is used as an input to M3. Splicing processing is performed on an output feature map of M3 and the input feature map of M3, and the spliced feature map is used as an input to M4 to obtain a feature map outputted by M4. Splicing processing is performed on the feature map outputted by M4 and the input feature of M4.

In this embodiment, the to-be-processed image of the second size is inputted into the processing unit of the first codec, and fusion processing is performed on the output feature map of the previous processing unit in the first codec and the input feature map of the previous processing unit, so that some features recovered by the previous processing unit can be fused with feature information not recovered by the processing unit. The fused feature map is used as an input to the next processing unit, so that the next processing unit can perform feature reconstruction according to more feature information until the last processing unit of the first codec outputs the first feature map. Effective feature information of each processing unit is added, and a calculation amount in a feature reconstruction process is reduced, thereby avoiding a problem of high fusion difficulty.

In this embodiment, a boot connection manner is used between processing units of the codec, and the boot connection provides two hop connection manners, as shown in FIG. 4 and FIG. 5. The first manner is to connect the inputted to-be-processed image of the second size to each intermediate processing unit as a part of the input. The second manner is to connect the input and output of each processing unit. According to the two processing manners, each processing unit can maintain basically the same input feature, which does not increase difficulty in feature extraction of a subsequent processing unit. In addition, each processing unit is maintained with a step-by-step optimization feature without causing too much feature deviation between the processing units. The formula of the boot connection may be expressed as:

$$m_i = L_i(\overline{m_i}) + m_{i-1}$$

$$\overline{m_i} = [m_0, m_{i-1}] \quad (1)$$

$L_i$ represents an $i^{th}$ processing unit; and $\overline{m_i}$ and $m_i$ are the input and output of the $i^{th}$ processing unit respectively. In the first manner, the input $\overline{m_i}$ refers to a feature map obtained by parallelizing an output of a previous processing unit and the to-be-processed image feature of the second size. In the second manner, the input $\overline{m_i}$ is a feature map obtained by parallelizing the output of the previous processing unit and the input to the previous processing unit.

Figure 6:
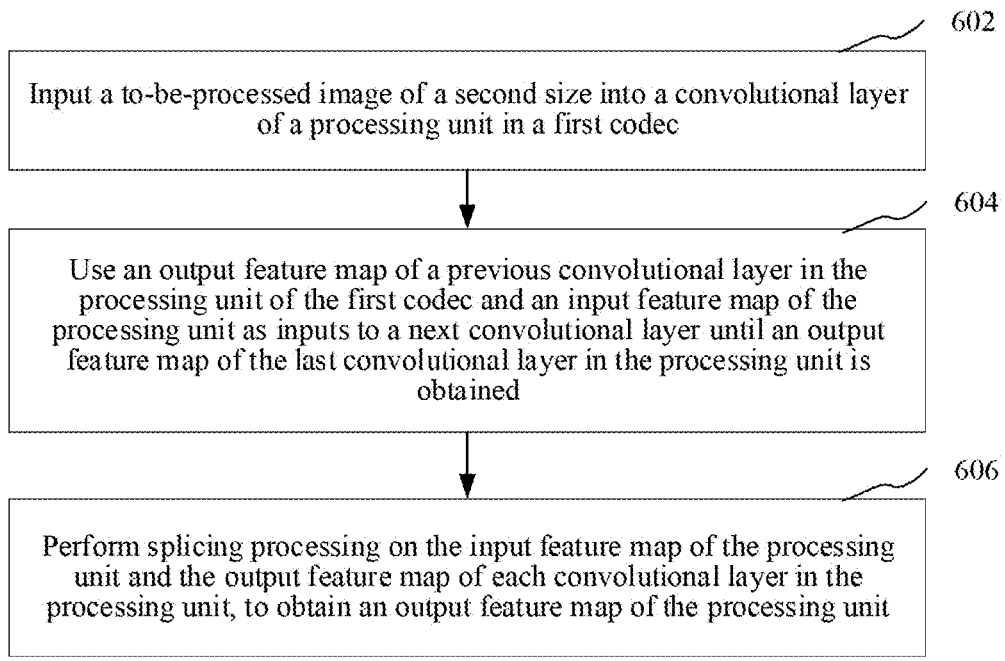
FIG. 6 is a schematic flowchart of a step of outputting a feature map by a processing unit of a first codec according to an embodiment.

In an embodiment, as shown in FIG. 6, the inputting the to-be-processed image of the second size into a processing unit of the first codec to obtain an output feature map includes:

In step 602, the to-be-processed image of the second size is input into a convolutional layer of the processing unit in the first codec.

Specifically, one processing unit includes at least two convolutional layers. Dimensions of each convolutional layer may be the same or different. The terminal inputs the to-be-processed image of the second size into the first processing unit in the first codec, and a first convolutional layer in the first processing unit in the first codec performs feature extraction on the to-be-processed image of the second size to obtain an output feature map outputted by the first convolutional layer. The first convolutional layer is the $1^{st}$ convolutional layer of the first processing unit in the first codec. The input feature map of the first processing unit is the to-be-processed image of the second size.

Then, the terminal uses the output feature map of the first convolutional layer of the first processing unit and an input feature map of a processing unit in which the first convolutional layer is located as inputs to a second convolutional layer. That is, the output feature map of the first convolutional layer in the first processing unit and the input feature map of the first processing unit (that is, the to-be-processed image of the second size) are inputted into the second convolutional layer to obtain an output feature map of the second convolutional layer.

Similarly, starting from the second convolutional layer in the first processing unit, the terminal uses an output feature map of a previous convolutional layer in the first processing unit and the input feature map of the first processing unit (that is, the to-be-processed image of the second size) as inputs to a next convolutional layer until an output feature map of the last convolutional layer in the first processing unit is obtained.

Then, after obtaining the output feature map of each convolutional layer in the first processing unit in the first codec, the terminal performs splicing processing on the output feature map of each convolutional layer in the first processing unit to obtain the output feature map of the first processing unit.

In step 604, an output feature map of a previous convolutional layer in the processing unit of the first codec and an input feature map of the processing unit are used as inputs to a next convolutional layer until an output feature map of the last convolutional layer in the processing unit is obtained.

Specifically, starting from the second processing unit, an output feature map of a previous processing unit and the input feature map of the first processing unit are spliced as input features to a next processing unit. Alternatively, the output feature map of the previous processing unit and the input feature map of the previous processing unit are fused as input features to the next processing unit.

Then, for each convolutional layer in the second processing unit in the first codec, the output feature map of the previous convolutional layer and the input feature map of the second processing unit are used as inputs to the next convolutional layer.

Similarly, starting from the second processing unit in the first codec, for each convolutional layer in each processing unit, an output feature map of a previous convolutional layer in a processing unit and an input feature map of the processing unit are used as inputs to a next convolutional layer in the processing unit until an output feature map of the last convolutional layer in the processing unit is obtained.

In step 606, a splicing processing is performed on the input feature map of the processing unit and the output feature map of each convolutional layer in the processing unit, to obtain the output feature map of the processing unit.

Specifically, after obtaining the output feature map of each convolutional layer in the processing unit in the first codec, the terminal performs splicing processing on the output feature map of each convolutional layer in the processing unit to obtain the output feature map of the processing unit.

In this embodiment, the to-be-processed image of the second size is inputted to the convolutional layer of the processing unit in the first codec, the output feature map of the previous convolutional layer in the processing unit in the first codec and the input feature map of the processing unit are used as inputs to the next convolutional layer, until the output feature map of the last convolutional layer in the processing unit is obtained, and the input feature map of the processing unit and the output feature map of each convolutional layer in the processing unit are spliced to obtain the output feature map of the processing unit, so that detailed content in an image can be better distinguished from a damaged feature in the image through multi-level feature fusion, and then coarse-scale real structure information and texture of the image can be further reconstructed.

Figure 7:
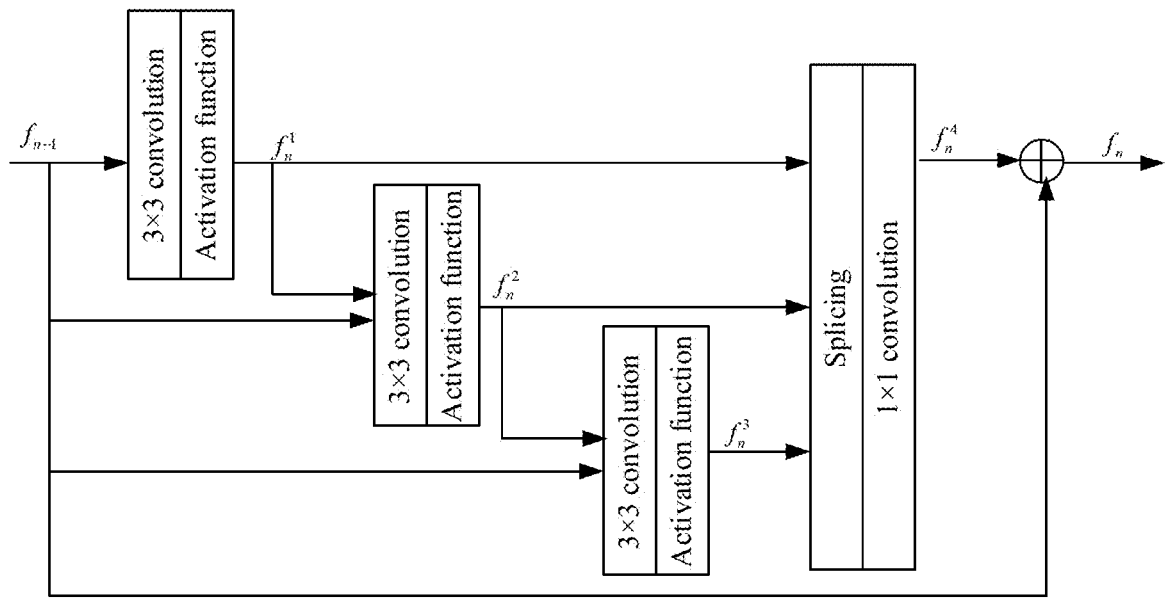
FIG. 7 is an internal structural diagram of a processing unit according to an embodiment.

An internal structure of a processing unit is shown in FIG. 7, and multi-level feature fusion can enable a neural network to better learn to distinguish between image content and a damaged feature of the image, and then better reconstruct real structure information and texture of the image. A formula for multi-level feature fusion is as follows:

$$f_n^1 = \sigma(\omega_n^1 * f_{n-1} + b_n^1)$$

$$f_n^2 = \sigma(\omega_n^2 * [f_n^1, f_{n-1}] + b_n^2)$$

$$f_n^3 = \sigma(\omega_n^3 * [f_n^2, f_{n-1}] + b_n^3)$$

$$f_n^4 = \omega_n^4 * [f_n^1, f_n^2, f_n^3] + b_n^4$$

$$f_n = f_{n-1} + f_n^4 \quad (2)$$

where $f_{n-1}$ and $f_n$ are an output of a previous unit and an output of a current unit, respectively; σ refers to a non-linear activation function; $b_n^1$ refers to an offset term of the first convolutional layer; and $\omega_n^1$ refers to a weight item of the first convolutional layer.

A feature residual is learned by an intermediate convolutional layer through a hop connection. The output of the previous unit is processed by using the first-layer convolution to obtain $f_n^1$, that is, convolution processing is performed on $f_{n-1}$ by using the first-layer convolution of 3×3 to obtain an output feature map, and the output feature map is corrected by using an activation layer to obtain $f_n^1$. The second-layer convolution parallelizes the output feature map $f_n^1$ of the first layer and the output feature $f_{n-1}$ of the previous unit as inputs, and then obtains $f_n^2$. The third-layer convolution parallelizes the output feature map $f_n^2$ of the second layer and the output feature $f_{n-1}$ of the previous unit as inputs, and then obtains $f_n^3$. The first three layers are subjected to 3×3 convolution processing, and after each convolutional layer, the output feature map is corrected by using the activation layer to obtain the output feature map of each layer. The fourth-layer convolution performs feature fusion on the output feature maps of the first three layers to obtain $f_n^4$, and performs fusion processing on $f_n^4$ and the output feature map $f_{n-1}$ of the previous unit to obtain the output feature map $f_n$ of the current processing unit.

In an embodiment, the performing feature reconstruction on the second feature map by using a second codec, to obtain a reconstructed first feature map includes:

inputting the second feature map into a processing unit of the second codec to obtain an output feature map; and performing splicing processing on an output feature map of a previous processing unit in the second codec and the second feature map to obtain an input to a next processing unit until the last processing unit in the second codec outputs the reconstructed first feature map.

Specifically, one encoder in the second codec includes at least two processing units, and one decoder also includes at least two processing units. An internal structure of each processing unit is the same. The terminal inputs the second feature map into the second codec, and a first processing unit in the second codec performs feature extraction on the second feature map to obtain an output feature map outputted by the first processing unit. The first processing unit is the $1^{st}$ processing unit in the second codec. Then, the terminal performs splicing processing on the output feature map of the first processing unit and an input feature map of the first processing unit, and inputs the spliced feature map to a second processing unit to obtain an output feature map of the second processing unit.

Similarly, the terminal performs splicing processing on an output feature map of a previous processing unit in the second codec and the input feature map (that is, the second feature map) of the first processing unit, and uses the spliced feature map as an input to a next processing unit until an output feature map of the last processing unit of the second codec is obtained. The output feature map of the last processing unit of the second codec is the first feature map outputted by the second codec.

In this embodiment, the second feature map is inputted into the processing unit of the second codec to obtain an output feature map, and the output feature map of the previous processing unit in the second codec and the second feature map are spliced, so that some features recovered by the previous processing unit can be associated with the feature map reconstructed by the previous processing unit, so that the next processing unit performs feature reconstruction more quickly. The spliced feature map is used as an input to the next processing unit until the last processing unit of the second codec outputs the reconstructed first feature map, thereby reconstructing intermediate scale feature information of the to-be-processed image.

In an embodiment, the performing feature reconstruction on the second feature map by using a second codec, to obtain a reconstructed first feature map includes:

inputting the second feature map into a processing unit of the second codec to obtain an output feature map; and performing fusion processing on an output feature map of a previous processing unit in the second codec and an input feature map of the previous processing unit to obtain an input to a next processing unit until the last processing unit in the second codec outputs the reconstructed first feature map.

Specifically, the terminal inputs the second feature map into the second codec, and a first processing unit in the second codec performs feature extraction on the second feature map to obtain an output feature map outputted by the first processing unit. Then, the terminal performs fusion processing on the output feature map of the first processing unit and the input feature map of the first processing unit, that is, performs fusion processing on the output feature map of the first processing unit and the second feature map, and inputs the fused feature map into the second processing unit to obtain the output feature map of the second processing unit.

Then, the terminal performs fusion processing on the output feature map of the second processing unit and the input feature map of the second processing unit, and uses the fused feature map as an input to a next processing unit of the second processing unit.

Similarly, starting from the second processing unit in the second codec, the terminal performs fusion processing on the output feature map of the previous processing unit and the input feature map of the previous processing unit, and uses the fused feature map as an input to the next processing unit until an output feature map of the last processing unit of the second codec is obtained. The output feature map of the last processing unit of the second codec is the first feature map outputted by the second codec.

In this embodiment, the second feature map is inputted into the processing unit of the second codec, and an output feature and an input feature of the same processing unit are fused, which can reduce a calculation amount and ensure correlation between features, so that a difference between features in the feature map is more obvious, and the intermediate scale feature is better reconstructed.

Figure 8:
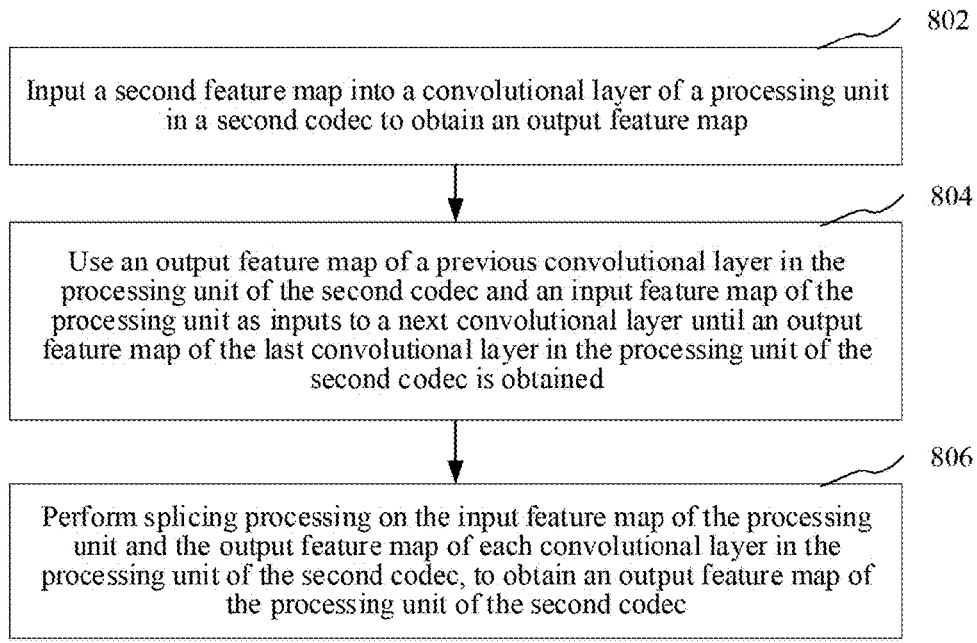
FIG. 8 is a schematic flowchart of a step of outputting a feature map by a processing unit of a second codec according to an embodiment.

In an embodiment, as shown in FIG. 8, the inputting the second feature map into a processing unit of the second codec, to obtain an output feature map includes:

In step 802, the second feature map is input into a convolutional layer of the processing unit in the second codec to obtain an output feature map.

Specifically, the terminal inputs the second feature map into the first processing unit in the second codec, and the first convolutional layer in the first processing unit in the second codec performs feature extraction on the to-be-processed image of the second size to obtain the output feature map outputted by the first convolutional layer. The first convolutional layer is the $1^{st}$ convolutional layer of the first processing unit in the second codec. The input feature map of the first processing unit is the to-be-processed image of the second size.

Then, the terminal uses the output feature map of the first convolutional layer of the first processing unit and an input feature map of a processing unit in which the first convolutional layer is located as inputs to a second convolutional layer. That is, the output feature map of the first convolutional layer in the first processing unit and the input feature map of the first processing unit (that is, the to-be-processed image of the second size) are inputted into the second convolutional layer to obtain the output feature map of the second convolutional layer of the first processing unit in the second codec.

Similarly, starting from the second convolutional layer in the first processing unit, the terminal uses an output feature map of a previous convolutional layer in the first processing unit and the input feature map of the first processing unit (that is, the second feature map) as inputs to a next convolutional layer until an output feature map of the last convolutional layer in the first processing unit is obtained.

Then, after obtaining the output feature map of each convolutional layer in the first processing unit in the second codec, the terminal performs splicing processing on the output feature map of each convolutional layer in the first processing unit to obtain the output feature map of the first processing unit.

In step 804, an output feature map of a previous convolutional layer in the processing unit of the second codec and an input feature map of the processing unit are used as inputs to a next convolutional layer until an output feature map of the last convolutional layer in the processing unit of the second codec is obtained.

Specifically, starting from the second processing unit in the second codec, an output feature map of a previous processing unit and the input feature map of the first processing unit are spliced as input features to a next processing unit. Alternatively, the output feature map of the previous processing unit and the input feature map of the previous processing unit are fused as input features to the next processing unit.

Then, for each convolutional layer in the second processing unit in the second codec, the output feature map of the previous convolutional layer and the input feature map of the second processing unit are used as inputs to the next convolutional layer.

Similarly, starting from the second processing unit in the second codec, for each convolutional layer in each processing unit, an output feature map of a previous convolutional layer in a processing unit and an input feature map of the processing unit are used as inputs to a next convolutional layer in the processing unit until an output feature map of the last convolutional layer in the processing unit is obtained.

In step 806, a splicing processing is performed on the input feature map of the processing unit and the output feature map of each convolutional layer in the processing unit of the second codec, to obtain the output feature map of the processing unit of the second codec.

Specifically, after obtaining the output feature map of each convolutional layer in the processing unit in the second codec, the terminal performs splicing processing on the output feature map of each convolutional layer in the processing unit to obtain the output feature map of the processing unit.

In this embodiment, the second feature map is inputted into the convolutional layer of the processing unit in the second codec, the output feature map of the previous convolutional layer in the processing unit in the second codec and the input feature map of the processing unit are used as inputs to the next convolutional layer until the output feature map of the last convolutional layer in the processing unit in the second codec is obtained, and the input feature map of the processing unit and the output feature map of each convolutional layer in the processing unit are spliced to obtain the output feature map of the processing unit in the second codec, so that the detail content of the image and the damaged feature in the image can be better distinguished through multi-level feature fusion, and then intermediate-scale real information and texture of the image are further reconstructed.

In an embodiment, the performing splicing processing on the input feature map of the processing unit and the output feature map of each convolutional layer in the processing unit, to obtain the output feature map of the processing unit in the second codec includes:

performing splicing processing on the output feature map of each convolutional layer in the processing unit; and performing fusion processing on the input feature map of the processing unit and the feature map obtained after the output feature map of each convolutional layer is spliced, to obtain the output feature map of the processing unit in the second codec.

Specifically, after obtaining the output feature map of each convolutional layer in the processing unit in the second codec, the terminal may perform splicing processing on the output feature map of each convolutional layer. Further, the terminal may determine a weight matrix corresponding to the output feature map of each convolutional layer, and add the weight matrix corresponding to the output feature map of each convolutional layer to obtain the spliced feature map.

Then, the terminal performs fusion processing on the spliced feature map and the input feature map of the processing unit. The fusion processing may be parallelizing the spliced feature map and the output feature map of the processing unit in the channel dimension, so as to obtain the output feature map of the processing unit.

For example, after obtaining the output feature map of each convolutional layer in the first processing unit in the second codec, the terminal may perform splicing processing on the output feature map of each convolutional layer. Then, the terminal performs fusion processing on the spliced feature map and the input feature map of the first processing unit, where the input to the first processing unit in the second codec is the second feature map, that is, performs fusion processing on the spliced feature map and the second feature map, to obtain the output feature map of the first processing unit.

For the second processing unit in the second codec, the output feature maps of the convolutional layers in the second processing unit are spliced. Fusion processing is performed on the spliced feature map and the input feature map of the second processing unit, to obtain the output feature map of the second processing unit.

In this embodiment, splicing processing is performed on the output feature map of each convolutional layer in the processing unit; and fusion processing is performed on the input feature map of the processing unit and the feature map obtained after the output feature map of each convolutional layer is spliced, to obtain the output feature map of the processing unit in the second codec. Therefore, multi-level feature fusion can be performed, so that the intermediate scale feature can be reconstructed according to more feature information, and further reference information can be provided for reconstruction of the fine scale feature, thereby reducing difficulty in fine scale feature reconstruction.

In an embodiment, the second preset quantity of pairs of encoders and decoders include the first codec and a third codec, and the third codec is located between an encoder and a decoder in the first codec; and the first preset quantity of pairs of encoders and decoders include the second codec and a fourth codec, and the fourth codec is located between an encoder and a decoder in the second codec.

Specifically, a first network includes the first codec, and the second network includes a second codec. The second codec includes the second preset quantity of pairs of encoders and decoders, and remaining pairs of encoders and decoders except the first codec in the second preset quantity of pairs of encoders and decoders are referred to as the third codec. The third codec is located between the encoder and the decoder in the first codec. After the feature map outputted by the first network and the to-be-processed image are spliced and inputted into the second network, the encoder of the first encoder included in the second encoder processes the spliced map, and then uses the output of the encoder as an input to a next encoder until the last encoder of the first encoder outputs a feature map. Then, the output feature map of the last encoder of the first encoder is used as an input to the first encoder in the third codec to obtain the output of the last encoder in the third codec. The output of the last encoder in the third codec is used as an input to a corresponding decoder in the third codec to obtain an output of the last decoder in the third codec. The output of the last decoder in the third codec is used as an input to a corresponding decoder in the first codec, so as to obtain an output feature map of the last decoder in the first codec, that is, obtain the first feature map reconstructed by the second network.

Next, the third network includes a target codec, and the target codec includes the first preset quantity of pairs of encoders and decoders. Remaining pairs of encoders and decoders in the first preset quantity of pairs of encoders and decoders except the second codec are referred to as the fourth codec. The fourth codec is located between the encoder and the decoder in the second codec. After the feature map outputted by the second network is zoomed in to the first size and spliced with the to-be-processed image of the first size and then inputted into the third network, a processing manner in the third network is the same as a processing manner in the second network, so as to obtain the target image outputted by the third network.

In this embodiment, a quantity of codecs is successively increased in three networks to separately reconstruct the coarse scale feature, the intermediate scale feature, and the fine scale feature of the to-be-processed image, so that reconstruction of obvious features can be deepened step by step to reconstruction of detail features, a clear image is obtained, and image deblurring and denoising processing is implemented.

Figure 9A:
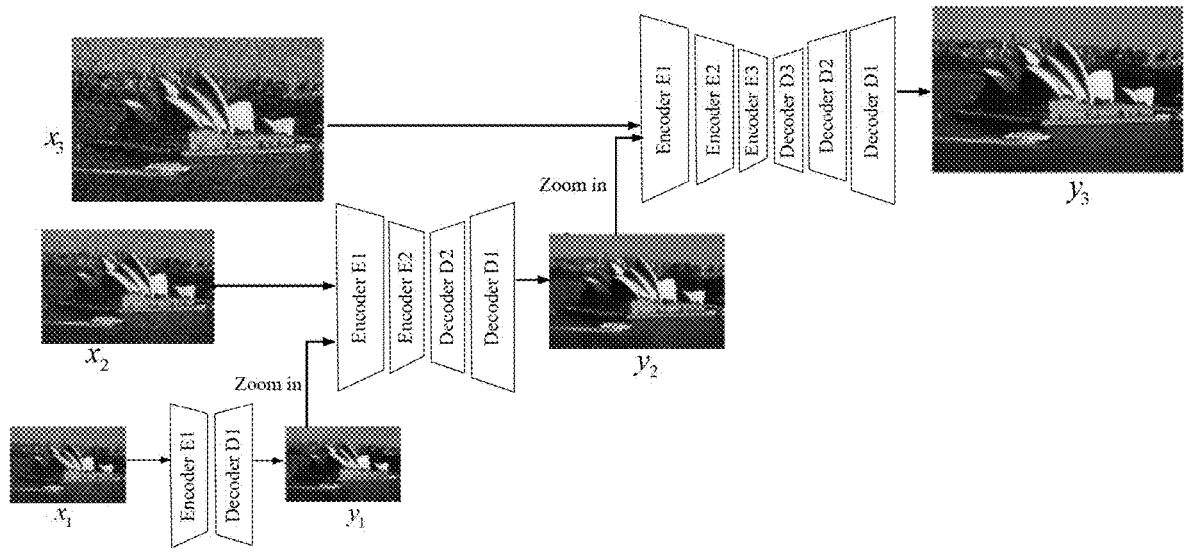
FIG. 9(a) is a network structural diagram of an image processing method according to an embodiment.

FIG. 9(a) is a network structural diagram of an image processing method according to an embodiment. In the image processing method in FIG. 9(a), there are three networks. The first network is a reconstruction network of a coarse scale feature, the second network is a reconstruction network of an intermediate scale feature, and the third network is a reconstruction network of a fine scale feature. The network of each scale is a codec network, but each network includes a different quantity of pairs of encoders/decoders. For the coarse scale, an original size of a to-be-processed image is reduced to ¼ size for processing, and the coarse scale network includes one pair of encoder $E_1$/decoder $D_1$ $$y_1 = \mathcal{F}_1(x_1) = \mathcal{D}_1(\varepsilon_1(x_1)) \qquad (3)$$

$x_1$ and $y_1$ are respectively an input image of the first network (that is, the to-be-processed image of ¼ size) and an output feature map of the first network. Next, the output feature map $y_1$ of the first network is zoomed in twice to obtain a feature map (that is, a first feature map) of ½ of the original size of the to-be-processed image, then the to-be-processed image is zoomed out to ½ of the original size, and $x_2$ of the ½ size and the feature map of the ½ size are parallelized in the channel dimension and used as an input $\tilde{x}_2$ to the second network (that is, a second feature map).

For the second network, two pairs of encoders/decoders are designed for intermediate scale recovery due to increased recovery difficulty. An encoder $E_2$/decoder $D_2$ is placed between an encoder $E_1$/decoder $D_1$ for processing more complex feature extraction and reconstruction of the intermediate scale. After intermediate scale processing, a result $y_2$ (that is, a reconstructed first feature map) is obtained.

$$y_2 = \mathcal{F}_2(\tilde{x}_2) = \mathcal{D}_1(\mathcal{D}_2(\varepsilon_2(\varepsilon_1(\tilde{x}_2)))) \qquad (4)$$

Similarly, in the third network, an encoder $E_3$/decoder $D_3$ is placed between the encoder $E_2$/decoder $D_2$ to obtain a fine scale network structure. An input $\tilde{x}_3$ to the fine scale is obtained after the result $y_2$ of the intermediate scale is zoomed in twice and then parallelized with the to-be-processed image $x_3$ of the original size in a channel dimension. After fine scale processing, a target image $y_3$ is obtained.

$$y_3 = \mathcal{F}_3(\tilde{x}_3) = \mathcal{D}_1(\mathcal{D}_2(\mathcal{D}_3(\varepsilon_3(\varepsilon_2(\varepsilon_1(\tilde{x}_n)))))) \qquad (5)$$

The entire structure of image processing includes three networks, which respectively process images of the coarse, intermediate, and fine scales. The entire network is trained by using N paired damaged/clear image groups. Training may be performed by using the following objective function:

$$\mathcal{L}(\theta) = \frac{1}{2N} \sum_{k=1}^{N} \sum_{i=1}^{S} \frac{1}{T_i} \|F_i(x_i^k; \theta_i) - z_i^k\|_2^2 \quad (6)$$

where $x_i^k$ and $z_i^k$ are respectively a damaged image and a clear image in a scale i; $\theta_i$ is a sub-network parameter of the scale i. $T_i$ is a quantity of pixels of the image in the scale i, which is used for normalization herein. L is an objective function for optimization; N is a quantity of image pairing; S is a quantity of scales of the image; and K refers to a number of the image.

Figure 9B:
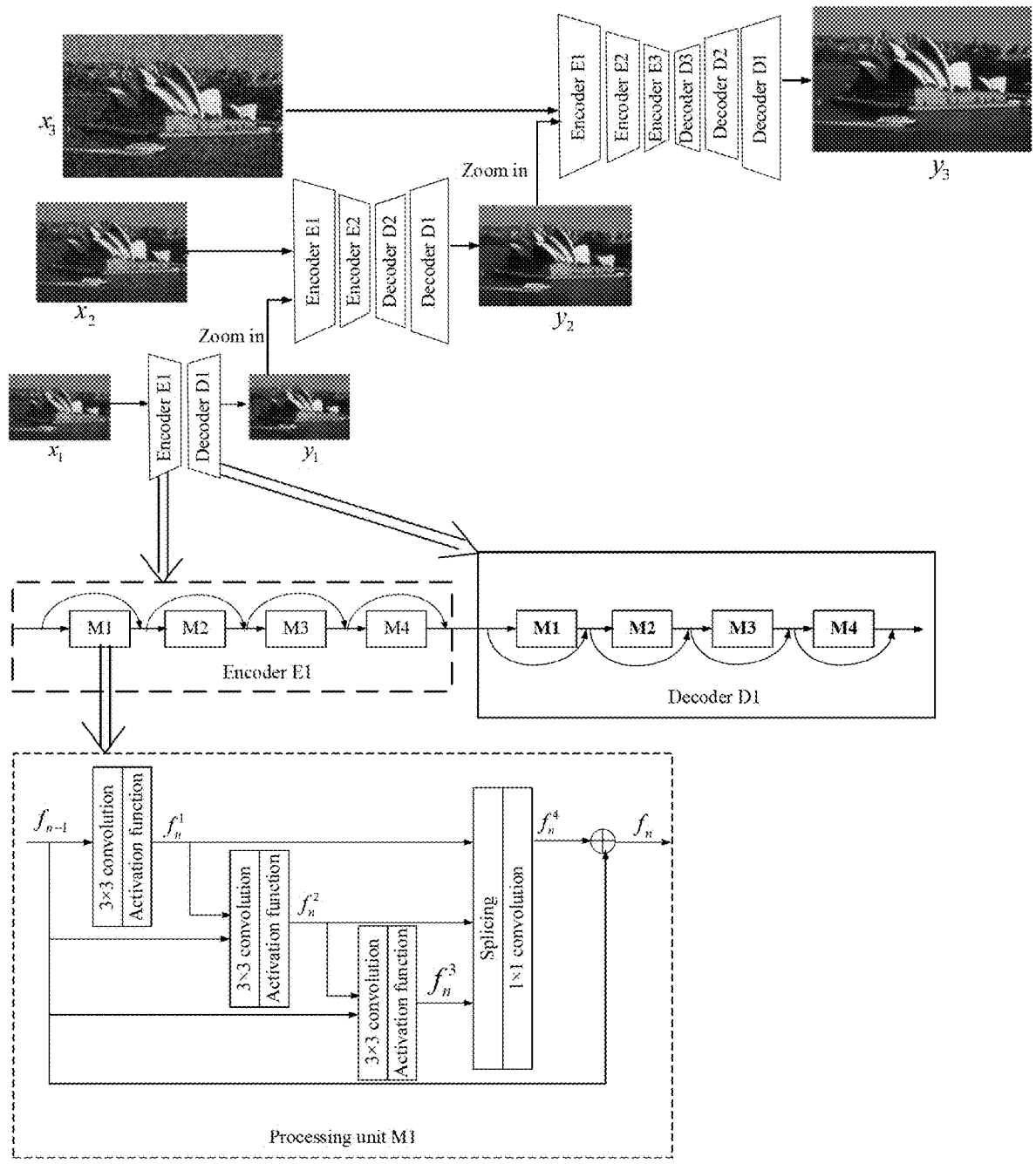
FIG. 9(b) is a network structural diagram of an image processing method according to another embodiment.

FIG. 9(b) is a network structural diagram of an image processing method according to an embodiment. In the image processing method in FIG. 9(b), there are three networks. The first network is a reconstruction network of a coarse scale feature, and includes a pair of encoder E1 and decoder D1. The second network is a reconstruction network of an intermediate scale feature, and includes a pair of encoder E1 and decoder D1, and a pair of encoder E2 and decoder D2. The third network is a reconstruction network of a fine scale feature, and includes a pair of encoder E1 and decoder D1, a pair of encoder E2 and decoder D2, and a pair of encoder E3 and decoder D3.

As shown in FIG. 9(b), internal structures of the encoder E1, the encoder E2, and the encoder E3 are the same, and each include processing units M1, M2, M3, and M4. Internal structures of the decoder D1, the decoder D2, and the decoder D3 are the same, and each include processing units M1, M2, M3, and M4.

In the first network, a to-be-processed image $x_1$ is inputted into the processing unit M1 in the encoder E1 to obtain an output feature map of M1. Next, starting from M2, the output feature map of M1 and the input feature map of M1 are spliced, and the spliced feature map is used as an input to M2. Splicing processing is performed on an output feature map of M2 and the input feature map of M2, and the spliced feature map is used as an input to M3. Splicing processing is performed on an output feature map of M3 and the input feature map of M3, and the spliced feature map is used as an input to M4 to obtain a feature map outputted by M4. Splicing processing is performed on the feature map outputted by M4 and the input feature map of M4 to obtain a feature map outputted by the encoder E1.

Then, the feature map outputted by the encoder E1 is input into the processing unit M1 in the decoder D1 to obtain an output feature map of M1. Next, starting from the processing unit M2 in the decoder D1, the output feature map of M1 and the input feature map of M1 are spliced, and the spliced feature map is used as an input to M2. Splicing processing is performed on an output feature map of M2 and the input feature map of M2, and the spliced feature map is used as an input to M3. Splicing processing is performed on an output feature map of M3 and the input feature map of M3, and the spliced feature map is used as an input to M4 to obtain a feature map outputted by M4. Splicing processing is performed on the feature map outputted by M4 and the input feature map of M4 to obtain a feature map $y_1$ outputted by the decoder D1.

Internal structures of the processing units in the encoder and the processing units in the decoder are the same, such as the structure of the processing unit M1 shown in FIG. 9(b).

$f_{n-1}$ is an output feature map of a previous unit. For the first processing unit M1 of the encoder E1 in the first network, $f_{n-1}$ is the to-be-processed image $x_1$. The to-be-processed image $x_1$ is inputted into the first processing unit M1 of the encoder E1, convolution processing is performed on $f_{n-1}$ by using first-layer convolution of 3×3 in the processing unit M1 to obtain an output feature map, and the output feature map is corrected by using an activation layer to obtain $f_n^1$. The processing process is the same as the processing process in FIG. 4, and details are not described herein again.

In this embodiment, coarse, intermediate, and fine scale features of the to-be-processed image are respectively reconstructed by using three networks, so as to obtain a clear target image $y^3$, as shown in FIG. 9(b).

Figure 10A:
FIG. 10(a) shows processing results of an image processing method in this solution in an embodiment and a plurality of related image processing methods in terms of deblurring.

FIG. 10(a) shows processing results of the image processing method in this embodiment and a plurality of related image processing methods in terms of deblurring. In the figure, the first column is a to-be-processed image, and the second column, the third column, and the fourth column are target images obtained after feature reconstruction is performed on the to-be-processed image by using the related image processing methods. The last column is a target image obtained after feature reconstruction is performed on the to-be-processed image by using the image processing method in this embodiment. It can be seen from FIG. 10(a) that the target image in the last column is clearer than the target images in the second column, the third column, and the fourth column. That is, an effect of the image processing method in this embodiment in terms of image deblurring is better than effects of the related processing manners.

Figure 10B:
FIG. 10(b) shows processing results of an image processing method in this solution in an embodiment and a plurality of related image processing methods in terms of denoising.

FIG. 10(b) shows processing results of the image processing method in this embodiment and a plurality of related image processing methods in terms of denoising. In the figure, the first column is a to-be-processed image, and the second column, the third column, and the fourth column are target images obtained after feature reconstruction is performed on the to-be-processed image by using the related image processing methods. The last column is a target image obtained after feature reconstruction is performed on the to-be-processed image by using the image processing method in this embodiment. It can be seen from FIG. 10(b) that the target image in the last column is clearer than the target images in the second column, the third column, and the fourth column. That is, an effect of the image processing method in this embodiment in terms of image denoising is better than effects of the related processing manners.

Figure 11:
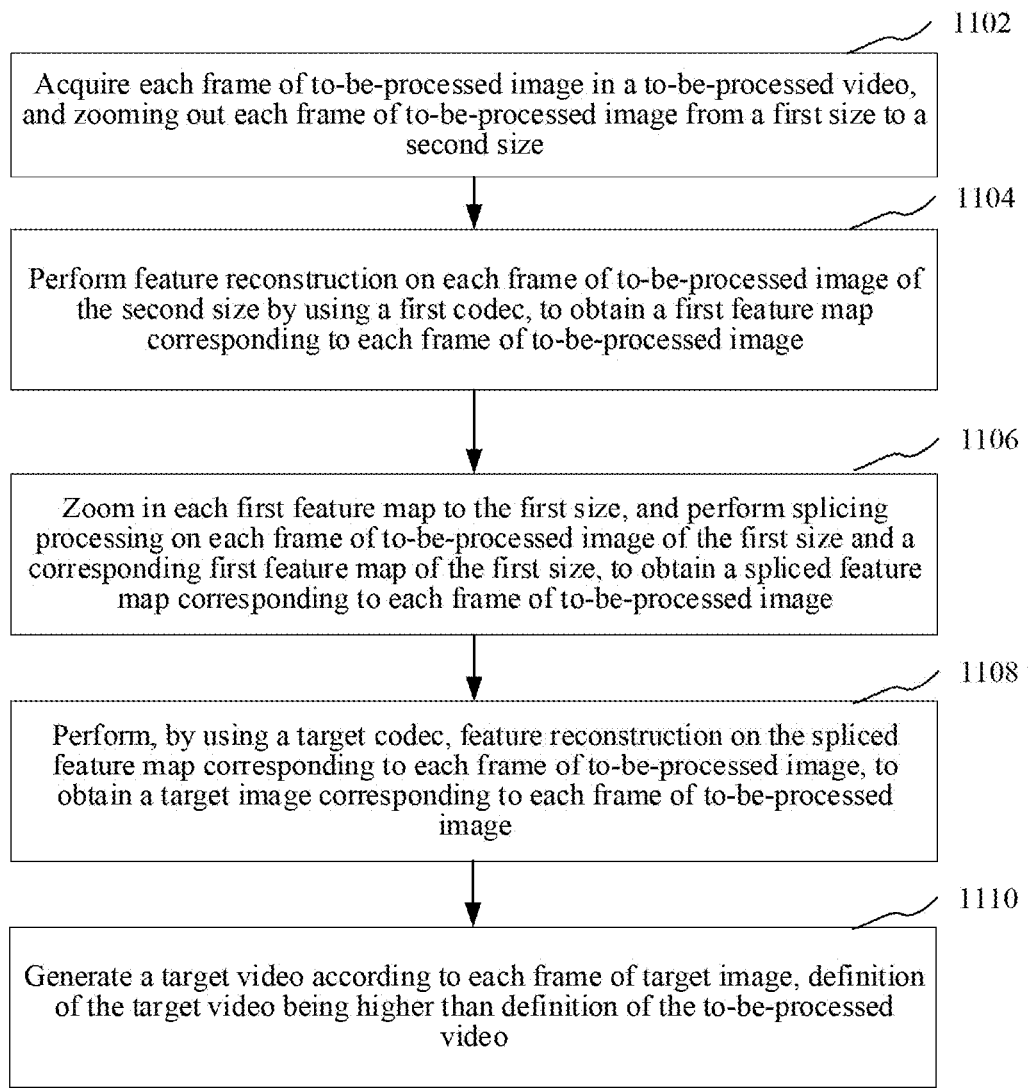
FIG. 11 is a schematic flowchart of an image processing method applied to video processing according to an embodiment.

In an embodiment, as shown in FIG. 11, the image processing method is applied to video processing. The to-be-processed image is a to-be-processed image in each frame in a to-be-processed video.

The acquiring a to-be-processed image, and zooming out the to-be-processed image from a first size to a second size includes:

In step 1102, each frame of to-be-processed image (also referred to as each to-be-processed image frame) in the to-be-processed video is acquired, and zoomed out from the first size to the second size.

The to-be-processed video is a video with low definition, such as a blurred video or a video with noise.

Specifically, a smaller image leads to a more obvious coarse scale feature of the image. A larger image leads to a more obvious detail feature of the image, that is, a more obvious fine scale feature. When each frame of blurred image in the to-be-processed video is zoomed out to a smaller size, the detail feature of the image is less displayed, and the coarse scale feature is more displayed, so that a degree of blurring of the image is significantly reduced. In this case, difficulty in reconstructing a feature of a small-size blurred image is less than difficulty in reconstructing a feature of an original-size blurred image. The terminal may acquire each frame of to-be-processed image in the to-be-processed video, and use a size of the obtained each frame of to-be-processed image as the first size. Then, the terminal zooms out each frame of to-be-processed image from the first size to the second size, so that the image displays a coarse scale feature, so as to first reconstruct a blurred region that exists in the coarse scale feature in the to-be-processed video.

The performing feature reconstruction on the to-be-processed image of the second size by using a first codec, to obtain a first feature map includes:

In step 1104, feature reconstruction is performed on each frame of to-be-processed image of the second size by using the first codec, to obtain a first feature map corresponding to each frame of to-be-processed image.

Specifically, the terminal may input each frame of to-be-processed image of the second size into a first network, where the first network is a network of a coarse scale feature of a reconstructed image. The first network includes the first codec, and a quantity of first codecs may be set according to a requirement. The encoder in the first codec in the first network performs feature extraction on each frame of to-be-processed image of the second size, and the encoder inputs the extracted each frame of feature map into the decoder corresponding to the encoder for decoding, to obtain each frame of feature map outputted by the decoder. Each frame of feature map outputted by the decoder is a first feature map corresponding to each frame of to-be-processed image.

In this embodiment, when there are at least two pairs of encoders and decoders in the first codec, each frame of to-be-processed image of the second size is encoded by using the first encoder, and each frame of feature map outputted by a previous encoder is encoded by using a next encoder until each frame of feature map outputted by the last encoder in the first codec is obtained. Then, in a decoder corresponding to the last encoder, each frame of feature map is decoded by using the decoder to obtain each frame of feature map outputted by the last decoder. Each frame of feature map outputted by the last decoder is a first feature map corresponding to each frame of to-be-processed image.

The zooming in the first feature map to the first size, and performing splicing processing on the to-be-processed image of the first size and the first feature map of the first size includes:

In step 1106, each first feature map is zoomed to the first size, and a splicing processing is performed on each frame of to-be-processed image of the first size and a corresponding first feature map of the first size, to obtain a spliced feature map corresponding to each frame of to-be-processed image.

Specifically, after each frame of first feature map is obtained, the terminal may zoom in each frame of first feature map to the same first size as the corresponding to-be-processed image, so as to first reconstruct a blurred region that exists in a fine scale feature. Then, the terminal performs splicing processing on each frame of to-be-processed image of the first size and each frame of corresponding first feature map of the first size.

In this embodiment, the terminal may determine a matrix corresponding to each frame of to-be-processed image of the first size and a matrix corresponding to each frame of first feature map of the first size, and splice the matrix of the to-be-processed image of the first size and the matrix of the corresponding first feature map of the first size to obtain a spliced feature map corresponding to each frame of to-be-processed image.

In this embodiment, the terminal may determine a channel dimension of each frame of to-be-processed image of the first size and a channel dimension of each corresponding first feature map of the first size, and parallelize each frame of to-be-processed image of the first size and each corresponding first feature map of the first size according to the channel dimension, to obtain a spliced feature map corresponding to each frame of to-be-processed image.

The performing feature reconstruction on the spliced feature map by using a target codec, to obtain a target image, definition of the target image being higher than definition of the to-be-processed image includes:

In step 1108, by using the target codec, feature reconstruction is performed on the spliced feature map corresponding to each frame of to-be-processed image, to obtain a target image corresponding to each frame of to-be-processed image.

Specifically, the terminal may input the spliced feature map corresponding to each frame of to-be-processed image into a target network, where the target network is a network of the fine scale feature of the reconstructed image. The target network includes a target codec, the target codec includes the first codec, and a quantity of the target codec may be set according to a requirement. The first encoder in the target codec in the target network performs feature extraction on the spliced feature map corresponding to each frame of to-be-processed image, and uses each frame of feature map outputted by a previous encoder as an input to a next encoder until each frame of feature map outputted by the last encoder in the target codec is obtained. Then, in a decoder corresponding to each frame of feature map input outputted by the last encoder, each frame of feature map is decoded by using the decoder. Each frame of feature map outputted by a previous decoder is used as an input to a next decoder to obtain each frame of target image corresponding to each frame of to-be-processed image and outputted by the last decoder in the target codec. A size of each frame of target image is the first size.

In step 1110, a target video is generated according to each frame of target image, definition of the target video being higher than definition of the to-be-processed video.

Specifically, the terminal may generate the target video from each frame of the target image at a time point of each frame of to-be-processed image in the to-be-processed video, to obtain a target video whose definition is higher than that of the to-be-processed video.

In this embodiment, the image processing method is applied to video processing, and the to-be-processed image is each frame of to-be-processed image in the to-be-processed video. Each frame of to-be-processed image in the to-be-processed video is acquired, and each frame of to-be-processed image is zoomed out from the first size to the second size; feature reconstruction is performed on each frame of to-be-processed image of the second size by using the first codec, to obtain the first feature map corresponding to each frame of to-be-processed image; each first feature map is zoomed in to the same first size as the corresponding to-be-processed image, and splicing processing is performed on each frame of to-be-processed image of the first size and the corresponding first feature map of the first size to obtain the spliced feature map corresponding to each frame of to-be-processed image; and the target codec performs feature reconstruction on the spliced feature map corresponding to each frame of to-be-processed image to obtain the target image corresponding to each frame of to-be-processed image, and the image processing method is applied to video processing, so that feature reconstruction can be performed on a plurality of blurred or images with noise at the same time, thereby improving image feature reconstruction efficiency. The target video is generated according to each frame of target image, so that a low-definition video can be reconstructed into a high-definition video.

In an embodiment, an image processing method is provided, including:

A terminal acquires a to-be-processed image, and zooms out the to-be-processed image from a first size to a second size.

Then, the terminal inputs the to-be-processed image of the second size into a convolutional layer of a processing unit in a first codec.

Then, the terminal uses an output feature map of a previous convolutional layer in the processing unit of the first codec and an input feature map of the processing unit as inputs to a next convolutional layer until an output feature map of the last convolutional layer in the processing unit is obtained.

Further, the terminal performs splicing processing on the input feature map of the processing unit and the output feature map of each convolutional layer in the processing unit, to obtain an output feature map of the processing unit.

Then, the terminal performs splicing processing on an output feature map of a previous processing unit in the first codec and the to-be-processed image of the second size, and uses the spliced feature map as an input to a next processing unit until the last processing unit in the first codec outputs a first feature map.

Then, the terminal zooms out the to-be-processed image of the first size to the same size as the first feature map, and parallelizes the first feature map and the to-be-processed image of the same size in a channel dimension to obtain a second feature map.

Further, the terminal inputs the second feature map into a convolutional layer of a processing unit in a second codec to obtain an output feature map, where the second codec includes a second preset quantity of pairs of encoders and decoders, and the first codec is at least one pair of the second preset quantity of pairs of encoders and decoders.

Then, the terminal uses an output feature map of a previous convolutional layer in the processing unit of the second codec and an input feature map of the processing unit as inputs to a next convolutional layer until an output feature map of the last convolutional layer in the processing unit of the second codec is obtained.

Further, the terminal performs splicing processing on the output feature map of each convolutional layer in the processing unit; and performs fusion processing on the input feature map of the processing unit and the feature map obtained after the output feature map of each convolutional layer is spliced, to obtain the output feature map of the processing unit in the second codec. The terminal performs splicing processing on an output feature map of a previous processing unit in the second codec and the second feature map to obtain an input to a next processing unit until the last processing unit in the second codec outputs the reconstructed first feature map.

Then, the terminal zooms in the reconstructed first feature map to the first size, and performs splicing processing on the to-be-processed image of the first size and the reconstructed first feature map of the first size.

Further, the terminal performs feature reconstruction on the spliced feature map by using a target codec to obtain a target image, definition of the target image being higher than definition of the to-be-processed image; and the target codec including a first preset quantity of pairs of encoders and decoders, and the first preset quantity of pairs of encoders and decoders including the second preset quantity of pairs of encoders and decoders.

In this implementation, the coarse scale feature reconstruction, the intermediate scale feature reconstruction, and the fine scale feature reconstruction of the to-be-processed image are performed, and combined with multi-level feature fusion, to better distinguish between the detailed image content and the damaged feature in the image, and then real structure information and texture of the image are further reconstructed, so that a low-definition to-be-processed image can be reconstructed into a high-definition target image.

FIG. 2 to FIG. 11 are schematic flowcharts of an image processing method according to an embodiment. It is to be understood that although the steps in the flowcharts of FIG. 2 to FIG. 11 are sequentially displayed in accordance with instructions of arrows, these steps are not necessarily performed sequentially in the order indicated by the arrows. Unless clearly specified in this specification, there is no strict sequence limitation on the execution of the steps, and the steps may be performed in another sequence. Moreover, at least some of the steps in FIG. 2 to FIG. 11 may include a plurality of sub-steps or a plurality of stages. These sub-steps or stages are not necessarily performed at the same moment, but may be performed at different moments. These sub-steps or stages are not necessarily performed sequentially, but may be performed in turn or alternately with at least one part of other steps or sub-steps or stages of the other steps.

Figure 12:
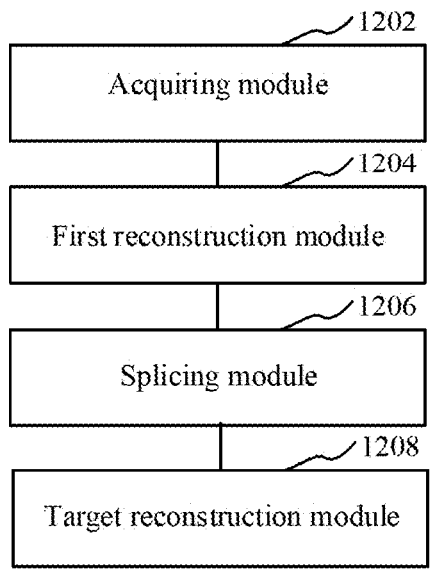
FIG. 12 is a structural block diagram of an image processing apparatus according to another embodiment.

In an embodiment, as shown in FIG. 12, an image processing apparatus is provided, and the apparatus includes an acquiring module 1202, a first reconstruction module 1204, a splicing module 1206, and a target reconstruction module 1208.

The acquiring module 1202 is configured to acquire a to-be-processed image, and zoom out the to-be-processed image from a first size to a second size;

the first reconstruction module 1204 is configured to perform feature reconstruction on the to-be-processed image of the second size by using a first codec, to obtain a first feature map;

the splicing module 1206 is configured to zoom in the first feature map to the first size, and perform splicing processing on the to-be-processed image of the first size and the first feature map of the first size; and the target reconstruction module 1208 is configured to perform feature reconstruction on the spliced feature map by using a target codec, to obtain a target image, definition of the target image being higher than definition of the to-be-processed image; and the target codec including a first preset quantity of pairs of encoders and decoders, and the first codec being at least one pair in the first preset quantity of pairs of encoders and decoders.

In the foregoing image processing apparatus, the to-be-processed image is acquired, the to-be-processed image is zoomed out from the first size to the second size, and feature reconstruction is performed on the to-be-processed image of the second size by using the first codec to obtain the first feature map, so that reconstruction of the coarse scale feature of the to-be-processed image can be completed. The first feature map is zoomed in to the first size same as that of the to-be-processed image, and splicing processing is performed on the to-be-processed image of the first size and the first feature map of the first size, so as to reconstruct the fine scale feature of the to-be-processed image. Feature reconstruction is performed on the spliced feature map by using the target codec to obtain the target image, where the target codec includes the first preset quantity of pairs of encoders and decoders, and the first codec is at least one of the first preset quantity of pairs of encoders and decoders, so as to reconstruct a low-definition to-be-processed image into a high-definition target image. By reconstructing the coarse scale feature and the fine scale feature of the to-be-processed image, a blurred to-be-processed image with noise can be reconstructed into a clear image.

In an embodiment, the apparatus further includes a second reconstruction module. The second reconstruction module is configured to: zoom out the to-be-processed image of the first size to a same size as the first feature map, and perform splicing processing on the first feature map and the to-be-processed image of the same size to obtain a second feature map; and perform feature reconstruction on the second feature map by using a second codec, to obtain a reconstructed first feature map, the second codec including a second preset quantity of pairs of encoders and decoders, and the first codec being at least one pair in the second preset quantity of pairs of encoders and decoders; and the first preset quantity of pairs of encoders and decoders including the second preset quantity of pairs of encoders and decoders; and the splicing module is further configured to zoom in the reconstructed first feature map to the first size, and perform splicing processing on the to-be-processed image of the first size and the reconstructed first feature map of the first size.

In this embodiment, the to-be-processed image of the first size is zoomed out to the same size as the first feature map, the first feature map and the to-be-processed image of the same size are spliced to obtain the second feature map, and feature reconstruction is performed on the second feature map by using the second codec, so as to reconstruct the intermediate scale feature of the to-be-processed image to obtain the reconstructed first feature map. The reconstructed first feature map is zoomed in to the first size, and splicing processing is performed on the to-be-processed image of the first size and the reconstructed first feature map of the first size, so as to reconstruct the fine scale feature of the to-be-processed image, so as to reconstruct a low-definition image into a high-definition image.

In an embodiment, the second reconstruction module is further configured to parallelize the first feature map and the to-be-processed image of the same size in a channel dimension to obtain the second feature map.

In this embodiment, the first feature map and the to-be-processed image of the same size are parallelized in the channel dimension, so that a feature of the first feature map and a feature of the to-be-processed image can be associated, and the obtained second feature map has more feature information, and feature reconstruction of the to-be-processed image is more accurate.

In an embodiment, the first reconstruction module 1204 is further configured to: input the to-be-processed image of the second size into a processing unit of the first codec to obtain an output feature map; and perform splicing processing on an output feature map of a previous processing unit in the first codec and the to-be-processed image of the second size, and use the spliced feature map as an input to a next processing unit until the last processing unit in the first codec outputs the first feature map.

In this embodiment, the to-be-processed image of the second size is input into the processing unit of the first codec, the output feature map of the previous processing unit in the first codec is spliced with the to-be-processed image of the second size, and the spliced feature map is used as an input to the next processing unit, so that some features recovered by the previous processing unit can be associated with information of an original image, and the next processing unit performs feature reconstruction more quickly. In addition, effective feature information of each processing unit is added, and a calculation amount in a feature reconstruction process is reduced, thereby avoiding a problem of high fusion difficulty.

In an embodiment, the first reconstruction module 1204 is further configured to: input the to-be-processed image of the second size into a processing unit of the first codec to obtain an output feature map; and perform fusion processing on an output feature map of a previous processing unit in the first codec and an input feature map of the previous processing unit, and use the fused feature map as an input to a next processing unit until the last processing unit in the first codec outputs the first feature map.

In this embodiment, the to-be-processed image of the second size is inputted into the processing unit of the first codec, and fusion processing is performed on the output feature map of the previous processing unit in the first codec and the input feature map of the previous processing unit, so that some features recovered by the previous processing unit can be fused with feature information not recovered by the processing unit. The fused feature map is used as an input to the next processing unit, so that the next processing unit can perform feature reconstruction according to more feature information until the last processing unit of the first codec outputs the first feature map. Effective feature information of each processing unit is added, and a calculation amount in a feature reconstruction process is reduced, thereby avoiding a problem of high fusion difficulty.

In an embodiment, the first reconstruction module 1204 is further configured to: input the to-be-processed image of the second size into a convolutional layer of the processing unit in the first codec; use an output feature map of a previous convolutional layer in the processing unit of the first codec and an input feature map of the processing unit as inputs to a next convolutional layer until an output feature map of the last convolutional layer in the processing unit is obtained; and perform splicing processing on the input feature map of the processing unit and the output feature map of each convolutional layer in the processing unit, to obtain the output feature map of the processing unit.

In this embodiment, the to-be-processed image of the second size is inputted to the convolutional layer of the processing unit in the first codec, the output feature map of the previous convolutional layer in the processing unit in the first codec and the input feature map of the processing unit are used as inputs to the next convolutional layer, until the output feature map of the last convolutional layer in the processing unit is obtained, and the input feature map of the processing unit and the output feature map of each convolutional layer in the processing unit are spliced to obtain the output feature map of the processing unit, so that detailed content in an image can be better distinguished from a damaged feature in the image through multi-level feature fusion, and then coarse-scale real structure information and texture of the image can be further reconstructed.

In an embodiment, the second reconstruction module is further configured to: input the second feature map into a processing unit of the second codec to obtain an output feature map; and perform splicing processing on an output feature map of a previous processing unit in the second codec and the second feature map to obtain an input to a next processing unit until the last processing unit in the second codec outputs the reconstructed first feature map.

In this embodiment, the second feature map is inputted into the processing unit of the second codec to obtain an output feature map, and the output feature map of the previous processing unit in the second codec and the second feature map are spliced, so that some features recovered by the previous processing unit can be associated with the feature map reconstructed by the previous processing unit, so that the next processing unit performs feature reconstruction more quickly. The spliced feature map is used as an input to the next processing unit until the last processing unit of the second codec outputs the reconstructed first feature map, thereby reconstructing intermediate scale feature information of the to-be-processed image.

In an embodiment, the second reconstruction module is further configured to: input the second feature map into a processing unit of the second codec to obtain an output feature map; and perform fusion processing on an output feature map of a previous processing unit in the second codec and an input feature map of the previous processing unit to obtain an input to a next processing unit until the last processing unit in the second codec outputs the reconstructed first feature map.

In this embodiment, the second feature map is inputted into the processing unit of the second codec, and an output feature and an input feature of the same processing unit are fused, which can reduce a calculation amount and ensure correlation between features, so that a difference between features in the feature map is more obvious, and the intermediate scale feature is better reconstructed.

In an embodiment, the second reconstruction module is further configured to: input the second feature map into a convolutional layer of the processing unit in the second codec to obtain an output feature map; use an output feature map of a previous convolutional layer in the processing unit of the second codec and an input feature map of the processing unit as inputs to a next convolutional layer until an output feature map of the last convolutional layer in the processing unit of the second codec is obtained; and perform splicing processing on the input feature map of the processing unit and the output feature map of each convolutional layer in the processing unit, to obtain the output feature map of the processing unit in the second codec.

In this embodiment, the second feature map is inputted into the convolutional layer of the processing unit in the second codec, the output feature map of the previous convolutional layer in the processing unit in the second codec and the input feature map of the processing unit are used as inputs to the next convolutional layer until the output feature map of the last convolutional layer in the processing unit in the second codec is obtained, and the input feature map of the processing unit and the output feature map of each convolutional layer in the processing unit are spliced to obtain the output feature map of the processing unit in the second codec, so that the detail content of the image and the damaged feature in the image can be better distinguished through multi-level feature fusion, and then intermediate-scale real information and texture of the image are further reconstructed.

In an embodiment, the second reconstruction module is further configured to: perform splicing processing on the output feature map of each convolutional layer in the processing unit of the second codec; and perform fusion processing on the second feature map and the feature map obtained after the output feature map of each convolutional layer is spliced, to obtain the output feature map of the processing unit in the second codec.

In this embodiment, splicing processing is performed on the output feature map of each convolutional layer in the processing unit; and fusion processing is performed on the input feature map of the processing unit and the feature map obtained after the output feature map of each convolutional layer is spliced, to obtain the output feature map of the processing unit in the second codec. Therefore, multi-level feature fusion can be performed, so that the intermediate scale feature can be reconstructed according to more feature information, and further reference information can be provided for reconstruction of the fine scale feature, thereby reducing difficulty in fine scale feature reconstruction.

In an embodiment, the second preset quantity of pairs of encoders and decoders in the apparatus include the first codec and a third codec, and the third codec is located between an encoder and a decoder in the first codec; and the first preset quantity of pairs of encoders and decoders include the second codec and a fourth codec, and the fourth codec is located between an encoder and a decoder in the second codec.

In this embodiment, a quantity of codecs is successively increased to separately reconstruct the coarse scale feature, the intermediate scale feature, and the fine scale feature of the to-be-processed image, so that reconstruction of obvious features can be deepened step by step to reconstruction of detail features, a clear image is obtained, and image deblurring and denoising processing is implemented.

In an embodiment, the acquiring module 1202 is further configured to acquire each frame of to-be-processed image in the to-be-processed video, and zoom out each frame of to-be-processed image from the first size to the second size.

The first reconstruction module 1204 is further configured to perform feature reconstruction on each frame of to-be-processed image of the second size by using the first codec, to obtain a first feature map corresponding to each frame of to-be-processed image.

The splicing module 1206 is further configured to: zoom in each first feature map to the first size, and perform splicing processing on each frame of to-be-processed image of the first size and a corresponding first feature map of the first size, to obtain a spliced feature map corresponding to each frame of to-be-processed image.

The target reconstruction module 1208 is further configured to: perform, by using the target codec, feature reconstruction on a spliced feature map corresponding to each frame of to-be-processed image, to obtain a target image corresponding to each frame of to-be-processed image; and generate a target video according to each frame of target image, definition of the target video being higher than definition of the to-be-processed video.

In this embodiment, the image processing method is applied to video processing, and the to-be-processed image is each frame of to-be-processed image in the to-be-processed video. Each frame of to-be-processed image in the to-be-processed video is acquired, and each frame of to-be-processed image is zoomed out from the first size to the second size; feature reconstruction is performed on each frame of to-be-processed image of the second size by using the first codec, to obtain the first feature map corresponding to each frame of to-be-processed image; each first feature map is zoomed in to the same first size as the corresponding to-be-processed image, and splicing processing is performed on each frame of to-be-processed image of the first size and the corresponding first feature map of the first size to obtain the spliced feature map corresponding to each frame of to-be-processed image; and the target codec performs feature reconstruction on the spliced feature map corresponding to each frame of to-be-processed image to obtain the target image corresponding to each frame of to-be-processed image, and the image processing method is applied to video processing, so that feature reconstruction can be performed on a plurality of blurred or images with noise at the same time, thereby improving image feature reconstruction efficiency. The target video is generated according to each frame of target image, so that a low-definition video can be reconstructed into a high-definition video.

It is noted that one or more modules, submodules, and/or units in the present disclosure can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 13:
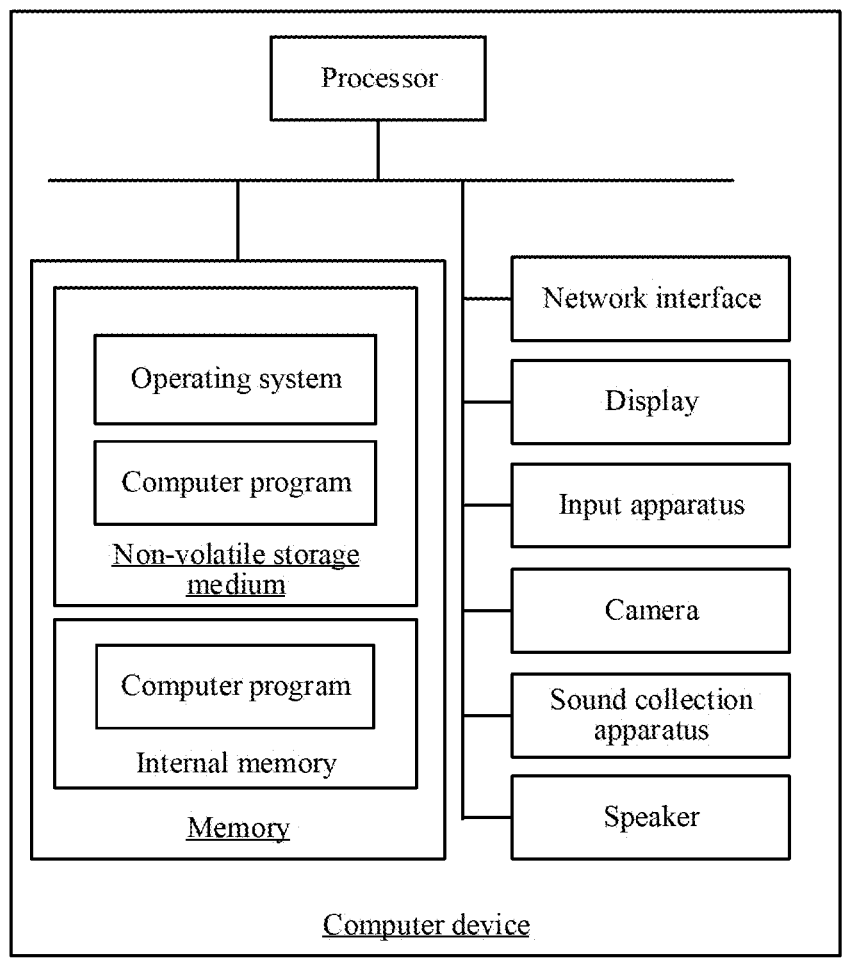
FIG. 13 is a structural block diagram of a computer device according to an embodiment.

FIG. 13 is an internal structural diagram of a computer device according to an embodiment. The computer device may be specifically the terminal 110 in FIG. 1. As shown in FIG. 13, the computer device includes processing circuitry such as a processor, a memory, a network interface, an input apparatus, and a display screen that are connected by a system bus. The memory includes a non-volatile storage medium and an internal memory. The non-volatile storage medium of the computer device stores an operating system and may further store a computer program, the computer program, when executed by the processor, causing the processor to implement the image processing method. The internal memory may also store a computer program, the computer program, when executed by the processor, causing the processor to perform the image processing method. The display screen of the computer device may be a liquid crystal display screen or an e-ink display screen. The input apparatus of the computer device may be a touch layer covering the display screen, or a button, a trackball, or a touchpad disposed on a housing of the computer device, or an external keyboard, touchpad, mouse, or the like.

A person skilled in the art may understand that, the structure shown in FIG. 13 is only a block diagram of a part of a structure correlated to a solution of this disclosure and does not limit the computer device to which the solution of this disclosure is applied. Specifically, the computer device may include more or fewer members than those in the drawings, or include a combination of some members, or include different member layouts.

In an embodiment, the image processing apparatus provided in this disclosure may be implemented in a form of a computer program, and the computer program may be run on the computer device shown in FIG. 13. The memory of the computer device may store program modules forming the image processing apparatus, for example, the acquiring module 1202, the first reconstruction module 1206, the splicing module 1208, and the target reconstruction module 1204 shown in FIG. 12. A computer program formed by the program modules causes the processor to perform steps in the image processing method in the embodiments of this disclosure described in this specification.

For example, the computer device shown in FIG. 13 may perform the step of acquiring a to-be-processed image, and zooming out the to-be-processed image from a first size to a second size by using the acquiring module 1202 in the image processing apparatus shown in FIG. 12; The computer device may perform, by using the first reconstruction module 1204, the step of performing feature reconstruction on the to-be-processed image of the second size by using a first codec, to obtain a first feature map. The computer device may perform, by using the splicing module 1206, the step of zooming in the first feature map to the first size, and performing splicing processing on the to-be-processed image of the first size and the first feature map of the first size. The computer device may perform, by using the target reconstruction module 1208, the step of performing feature reconstruction on the spliced feature map by using a target codec, to obtain a target image, definition of the target image being higher than definition of the to-be-processed image; and the target codec including a first preset quantity of pairs of encoders and decoders, and the first codec being at least one pair in the first preset quantity of pairs of encoders and decoders.

In an embodiment, a computer device is provided, including a memory and a processor, the memory storing a computer program, the computer program, when executed by the processor, causing the processor to perform steps of the image processing method. The steps in the image processing method may be steps in the image processing method in the foregoing embodiments.

In an embodiment, a computer readable storage medium (e.g., a non-transitory computer-readable storage medium) is provided, storing a computer program, the computer program, when executed by a processor, causing the processor to perform the steps of the foregoing image processing method. The steps in the image processing method may be steps in the image processing method in the foregoing embodiments.

In an embodiment, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of procedures of the methods in the foregoing embodiments may be implemented by a computer program instructing relevant hardware. The program may be stored in a non-volatile computer-readable storage medium. When the program is executed, the procedures of the foregoing method embodiments may be included. Any reference to a memory, a storage, a database, or another medium used in the embodiments provided in this disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), a flash memory, or the like. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (RDRAM).

The technical features in the foregoing embodiments may be combined in various manners. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments show only several implementations of this disclosure and are described in detail, which, however, are not to be construed as a limitation to the patent scope of this disclosure. For a person of ordinary skill in the art, several transformations and improvements can be made without departing from the idea of this disclosure. These transformations and improvements belong to the protection scope of this disclosure.

What is claimed is:

1. A method of image processing, comprising:
acquiring a to-be-processed image;
zooming out the to-be-processed image from a first size to a second size;
performing a splicing processing on a first output feature map from a first processing unit and the to-be-processed image of the second size to obtain a first spliced output feature map for inputting into a second processing unit of a first codec;
determining, by processing circuitry of an electronic device, a first feature map based on at least a feature reconstruction on the to-be-processed image of the second size by the first codec of a first set of coding units, the first set of coding units comprising at least a pair of encoder and decoder, a coding unit in the first codec including at least the first processing unit and the second processing unit;
zooming in the first feature map to the first size;
performing a splicing processing on the to-be-processed image of the first size and the first feature map of the first size to obtain a spliced feature map; and
performing a feature reconstruction on the spliced feature map by a target codec, to obtain a target image, the target codec comprising a target set of coding units, a first subset of the target set of coding units corresponding to the first set of coding units.

2. The method according to claim 1, wherein the determining the first feature map comprises:
performing the feature reconstruction on the to-be-processed image of the second size by the first codec to obtain a coarse feature map of the second size;
zooming in the coarse feature map of the second size to obtain a zoomed coarse feature map of a third size between the first size and the second size;
zooming out the to-be-processed image of the first size to the third size;
performing a splicing processing on the zoomed coarse feature map of the third size and the to-be-processed image of the third size to obtain a second feature map; and
performing a feature reconstruction on the second feature map by a second codec, to obtain the first feature map, the second codec comprising a second set of coding units, a second subset of the target set of coding units corresponding to the second set of coding units, and a subset of the second set of coding units corresponding to the first set of coding units.

3. The method according to claim 2, wherein the performing splicing processing on the zoomed coarse feature map of the third size and the to-be-processed image of the third size to obtain the second feature map comprises:
combining the zoomed coarse feature map of the third size and the to-be-processed image of the third size in parallel in a channel dimension to obtain the second feature map.

4. The method according to claim 1, further comprising:
generating the first output feature map by the first processing unit based on a first input feature map; and
performing a fusion processing on the first output feature map of the first processing unit and the first input feature map of the first processing unit to obtain a first fused feature map for inputting to the second processing unit of the first codec.

5. The method according to claim 1, wherein the coding unit of the first codec comprises a processing unit that generates an output feature map in response to an input feature map by a plurality of convolution layers, and the method comprises:
generating, by a first convolution layer in the plurality of convolution layers, a first intermediate feature map in response to the input feature map and a second intermediate feature map output from a second convolution layer in the plurality of convolution layers; and
performing a splicing processing on the input feature map of the processing unit and intermediate feature map outputs from the plurality of convolution layers to obtain the output feature map of the processing unit.

6. The method according to claim 2, further comprising:
performing a splicing processing on the first output feature map from the first processing unit and the to-be-processed image of the second size to obtain the first spliced output feature map for inputting into the second processing unit of the first codec.

7. The method according to claim 2, further comprising:
generating the first output feature map by the first processing unit based on a first input feature map; and
performing a fusion processing on the first output feature map of the first processing unit and the first input feature map of the first processing unit to obtain a first fused feature map for inputting to the second processing unit of the first codec.

8. The method according to claim 2, wherein the coding unit in at least one of the first codec or the second codec comprises a processing unit that generates an output feature map in response to an input feature map based on a plurality of convolution layers, and the method comprises:
generating, by a first convolution layer in the plurality of convolution layers, a first intermediate feature map in response to the input feature map and a second intermediate feature map output from a second convolution layer in the plurality of convolution layers; and
performing a splicing processing on the input feature map of the processing unit and intermediate feature map outputs from the plurality of convolution layers to obtain the output feature map of the processing unit.

9. The method according to claim 2, wherein the second codec comprises an encoding portion of the first codec, a decoding portion of the first codec and a third codec between the encoding portion of the first codec and the decoding portion of the first codec, and target codec comprises an encoding portion of the second codec, a decoding portion of the second codec and a fourth codec between the encoding portion of the second codec and the decoding portion of the second codec.

10. The method according to claim 1, wherein the acquiring the to-be-processed image comprises:
acquiring the to-be-processed image from a to-be-processed video.

11. An apparatus, comprising processing circuitry configured to:
acquire a to-be-processed image;
zoom out the to-be-processed image from a first size to a second size;
perform a splicing processing on a first output feature map from a first processing unit and the to-be-processed image of the second size to obtain a first spliced output feature map for input into a second processing unit of a first codec;
determine a first feature map based on at least a feature reconstruction on the to-be-processed image of the second size by a first codec of a first set of coding units, the first set of coding units comprising at least a pair of encoder and decoder, a coding unit in the first codec including at least the first processing unit and the second processing unit;
zoom in the first feature map to the first size;
perform a splicing processing on the to-be-processed image of the first size and the first feature map of the first size to obtain a spliced feature map; and
perform a feature reconstruction on the spliced feature map by a target codec, to obtain a target image, the target codec comprising a target set of coding units, a first subset of the target set of coding units corresponding to the first set of coding units.

12. The apparatus according to claim 11, wherein the processing circuitry is configured to:
perform the feature reconstruction on the to-be-processed image of the second size by the first codec to obtain a coarse feature map of the second size;
zoom in the coarse feature map of the second size to obtain a zoomed coarse feature map of a third size between the first size and the second size;
zoom out the to-be-processed image of the first size to the third size;
perform a splicing processing on the zoomed coarse feature map of the third size and the to-be-processed image of the third size to obtain a second feature map; and
perform a feature reconstruction on the second feature map by a second codec, to obtain the first feature map, the second codec comprising a second set of coding units, a second subset of the target set of coding units corresponding to the second set of coding units, and a subset of the second set of coding units corresponding to the first set of coding units.

13. The apparatus according to claim 12, wherein the processing circuitry is configured to:
combine the zoomed coarse feature map of the third size and the to-be-processed image of the third size in parallel in a channel dimension to obtain the second feature map.

14. The apparatus according to claim 11, wherein the processing circuitry is configured to:
generate the first output feature map by the first processing unit based on a first input feature map; and
perform a fusion processing on the first output feature map of the first processing unit and the first input feature map of the first processing unit to obtain a first fused feature map for inputting to the second processing unit of the first codec.

15. The apparatus according to claim 11, wherein the coding unit of the first codec comprises a processing unit that generates an output feature map in response to an input feature map by a plurality of convolution layers, and the processing circuitry is configured to:
generate, by a first convolution layer in the plurality of convolution layers, a first intermediate feature map in response to the input feature map and a second intermediate feature map output from a second convolution layer in the plurality of convolution layers; and
perform a splicing processing on the input feature map of the processing unit and intermediate feature map outputs from the plurality of convolution layers to obtain the output feature map of the processing unit.

16. The apparatus according to claim 12, wherein the second codec comprises an encoding portion of the first codec, a decoding portion of the first codec and a third codec between the encoding portion of the first codec and the decoding portion of the first codec, and target codec comprises an encoding portion of the second codec, a decoding portion of the second codec and a fourth codec between the encoding portion of the second codec and the decoding portion of the second codec.

17. The apparatus according to claim 11, wherein the processing circuitry is configured to:
acquire the to-be-processed image from a to-be-processed video.

18. A non-transitory computer-readable medium storing instructions which when executed by a computer cause the computer to perform:
acquiring a to-be-processed image;
zooming out the to-be-processed image from a first size to a second size;
performing a splicing processing on a first output feature map from a first processing unit and the to-be-processed image of the second size to obtain a first spliced output feature map for inputting into a second processing unit of a first codec;
determining a first feature map based on at least a feature reconstruction on the to-be-processed image of the second size by a first codec of a first set of coding units, the first set of coding units comprising at least a pair of encoder and decoder, a coding unit in the first codec including at least the first processing unit and the second processing unit;
zooming in the first feature map to the first size;
performing a splicing processing on the to-be-processed image of the first size and the first feature map of the first size to obtain a spliced feature map; and
performing a feature reconstruction on the spliced feature map by a target codec, to obtain a target image, the target codec comprising a target set of coding units, a first subset of the target set of coding units corresponding to the first set of coding units.

* * * * *

UNITED STATES PATENT AND TRADEMARK OFFICE
CERTIFICATE OF CORRECTION

PATENT NO. : 12,223,616 B2  
APPLICATION NO. : 17/727042  
DATED : February 11, 2025  
INVENTOR(S) : Hongyun Gao Page 1 of 1

It is certified that error appears in the above-identified patent and that said Letters Patent is hereby corrected as shown below:

On the Title Page

Item (71), the Applicant city reads as:  
Guangdong (CN)  
Should read as:  
--Shenzhen (CN)--

Item (72), the Inventor city reads as:  
Guangdong (CN)  
Should read as:  
--Shenzhen (CN)--

Signed and Sealed this  
Sixteenth Day of September, 2025

Coke Morgan Stewart  
*Acting Director of the United States Patent and Trademark Office*